United States Patent
Siddiqui et al.

(10) Patent No.: US 9,681,109 B2
(45) Date of Patent: Jun. 13, 2017

(54) SYSTEMS AND METHODS FOR CONFIGURABLE DEMODULATION

(71) Applicant: QUALCOMM Incorporated, San Diego, CA (US)

(72) Inventors: Hasib Ahmed Siddiqui, San Diego, CA (US); Kalin Mitkov Atanassov, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/864,554

(22) Filed: Sep. 24, 2015

(65) Prior Publication Data
US 2017/0054952 A1     Feb. 23, 2017

Related U.S. Application Data

(60) Provisional application No. 62/207,704, filed on Aug. 20, 2015.

(51) Int. Cl.
*H04N 5/225* (2006.01)
*H04N 5/235* (2006.01)
(Continued)

(52) U.S. Cl.
CPC ............ *H04N 9/04* (2013.01); *G02B 5/201* (2013.01); *G06T 7/60* (2013.01); *H04N 5/2258* (2013.01);
(Continued)

(58) Field of Classification Search
CPC ...... H04N 9/04; H04N 5/2258; H04N 5/2355; H04N 5/2352; G06T 7/60; G06T 2207/20024; G02B 5/201
See application file for complete search history.

(56) References Cited

U.S. PATENT DOCUMENTS 4,167,750 A * 9/1979 Tomimoto ............... H04N 9/77
                                                      348/645
4,991,003 A * 2/1991 Sendelweck ........... H04N 9/646
                                                      348/663
(Continued)

FOREIGN PATENT DOCUMENTS

WO     WO-2011119893 A2     9/2011

OTHER PUBLICATIONS

Dubois E, "Frequency-Domain Methods for Demosaicking of Bayer-Sampled Color Images", IEEE Signal Processing Letters, Dec. 2005, vol. 12, No. 12, pp. 847-850.

(Continued)

*Primary Examiner* — Hung Lam
(74) *Attorney, Agent, or Firm* — Knobbe, Martens, Olson & Bear LLP

(57) ABSTRACT

Exemplary embodiments are directed to configurable demodulation of image data produced by an image sensor. In some aspects, a method includes receiving information indicating a configuration of the image sensor. In some aspects, the information may indicate a configuration of sensor elements and/or corresponding color filters for the sensor elements. A modulation function may then be generated based on the information. In some aspects, the method also includes demodulating the image data based on the generated modulation function to determine chrominance and luminance components of the image data, and generating the second image based on the determined chrominance and luminance components.

30 Claims, 15 Drawing Sheets

(51) Int. Cl.
*H04N 9/04* (2006.01)
*G06T 7/60* (2017.01)
*G02B 5/20* (2006.01)

(52) U.S. Cl.
CPC ......... *H04N 5/2352* (2013.01); *H04N 5/2355* (2013.01); *G06T 2207/20024* (2013.01)

(56) References Cited

U.S. PATENT DOCUMENTS

| | | | | |
|---|---|---|---|---|
| 5,130,798 | A * | 7/1992 | Christopher | H04N 7/012 348/620 |
| 6,791,615 | B1 * | 9/2004 | Shiomi | H04N 3/1575 348/218.1 |
| 8,644,603 | B2 | 2/2014 | Singh et al. | |
| 8,761,504 | B2 | 6/2014 | Hirakawa et al. | |
| 8,873,847 | B2 | 10/2014 | Alacoque | |
| 2003/0156228 | A1 * | 8/2003 | Lee | H04N 5/40 348/724 |
| 2007/0177236 | A1 | 8/2007 | Kijima et al. | |
| 2007/0229682 | A1 * | 10/2007 | Nishide | H04N 1/40012 348/255 |
| 2013/0064448 | A1 | 3/2013 | Tomaselli et al. | |
| 2016/0073076 | A1 * | 3/2016 | Carroll | H04N 5/217 348/242 |

OTHER PUBLICATIONS

Hirakawa K., et al., "Adaptive homogeneity-directed demosaicing algorithm", In Proc. IEEE Int. Conf. Image Processing, Mar. 2005, vol. 14, No. 3, pp. 360-369.

Hirakawa K., et al., "Spatio-Spectral Color Filter Array Design for Optimal Image Recovery", IEEE Transactions on Image Processing, Feb. 2008, pp. 1876-1890.

Lu Y.M., et al., "Optimal Color Filter Array Design: Quantitative Conditions and an Efficient Search Procedure", IS&T/SPIE Electronic Imaging, International Society for Optics and Photonics, 2009, 8 Pages.

Lukac R. et al., "Color Filter Arrays: Design and Performance Analysis", IEEE Transactions on Consumer Electronics; Nov. 2005, vol. 51, No. 4, pp. 1260-1267.

Wan G., et al., "CMOS image sensors with multi-bucket pixels for computational photography", IEEE Journal of Solid-State Circuits, Apr. 2012, vol. 47, No. 4, pp. 1031-1042.

Condat L, "A New Class of Color Filter Arrays with Optimal Sensing Properties," Dec. 1, 2008 (Dec. 1, 2008), XP55269827, Retrieved from the Internet: URL://https://hal.archives-ouvertes.fr/hal-00347433v2/document [retrieved on May 2, 2016], 15 pages.

Condat L, "A New Color Filter Array With Optimal Properties for Noiseless and Noisy Color Image Acquisition," IEEE Transactions on Image Processing, IEEE Service Center, Piscataway, NJ, US, Aug. 1, 2011 (Aug. 1, 2011), vol. 20(8), pp. 2200-2210, XP011329862.

International Search Report and Written Opinion—PCT/US2016/043346—ISA/EPO—Dec. 2, 2016.

Wang J., et al., "New Color Filter Arrays of High Light Sensitivity and High Demosaicking Performance," Image Processing (ICIP), 2011 18th Ieee International Conference on, IEEE, Sep. 11, 2011 (Sep. 11, 2011), pp. 3153-3156, XP032080342.

* cited by examiner

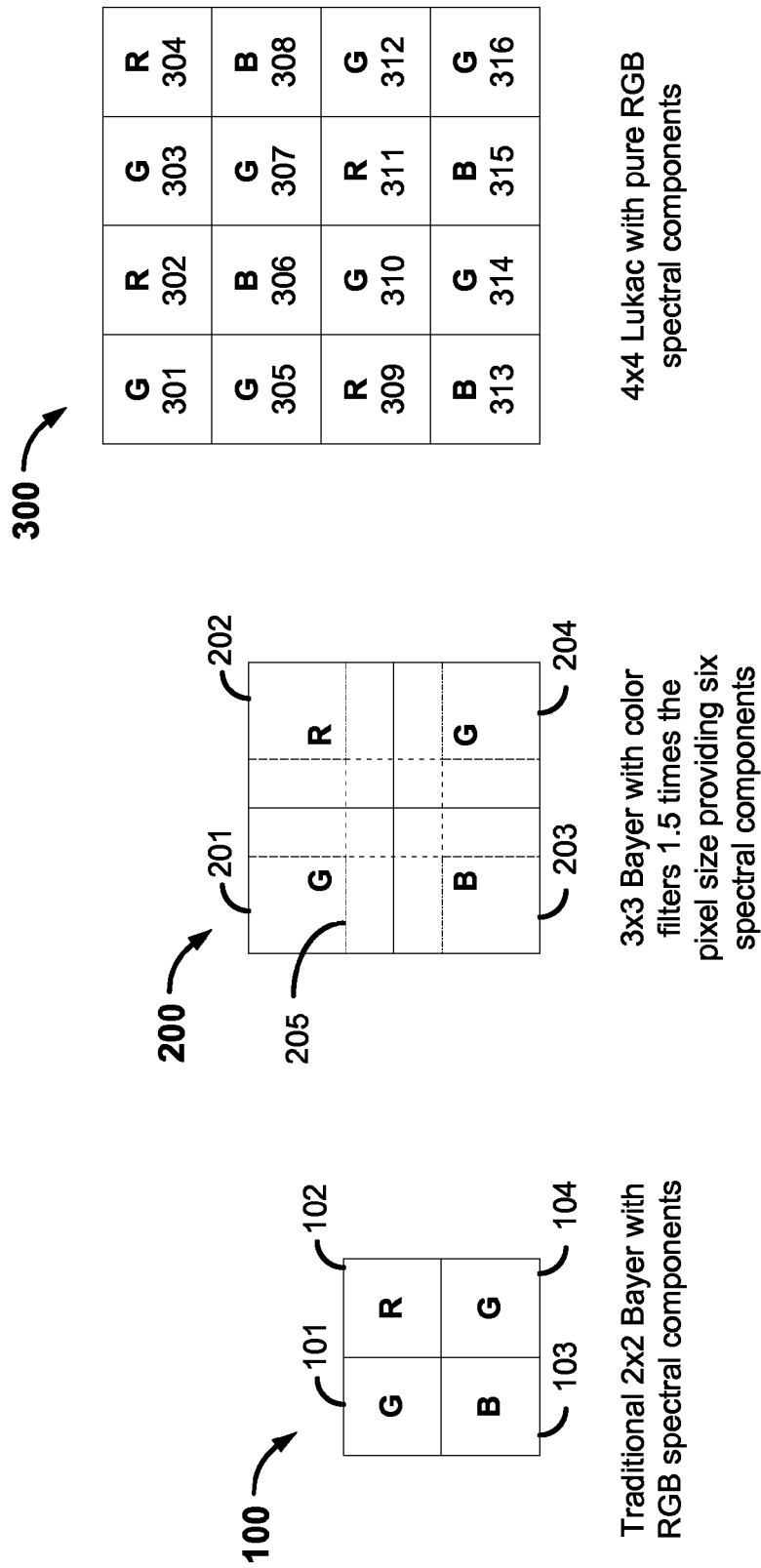

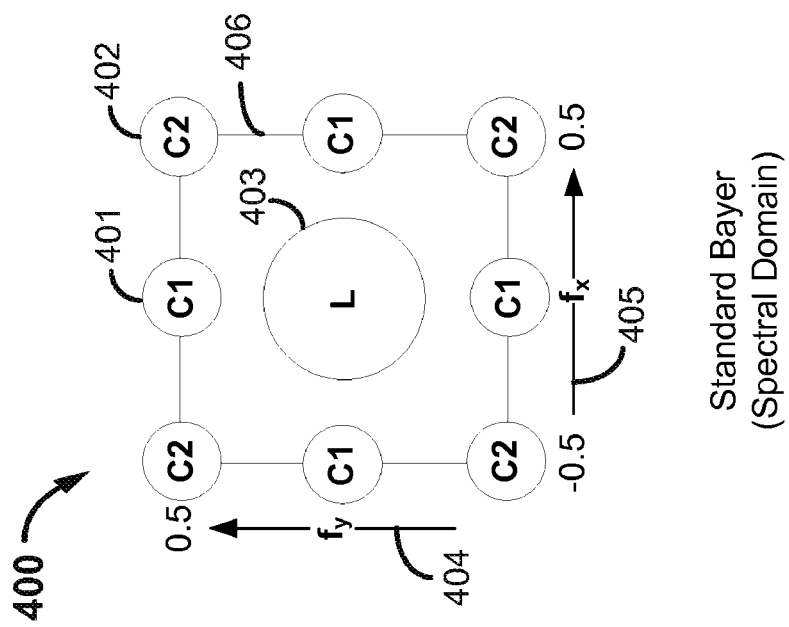
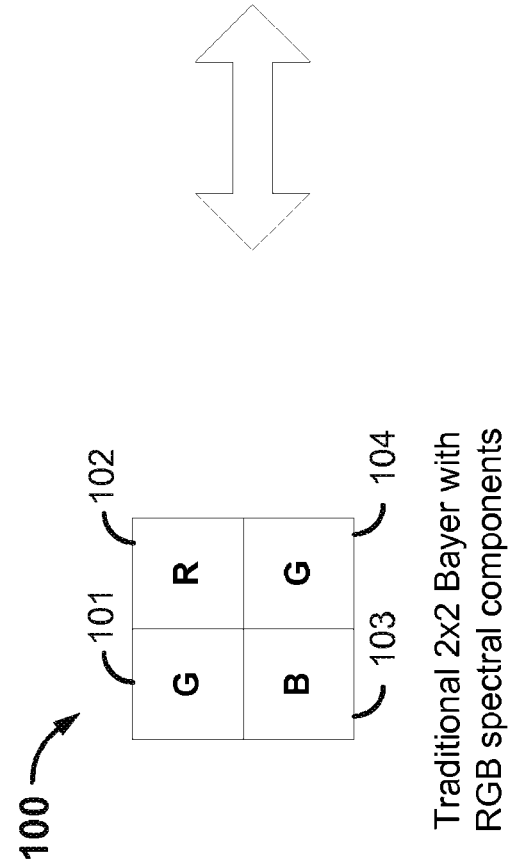
FIG. 4

SYSTEMS AND METHODS FOR CONFIGURABLE DEMODULATION

CROSS REFERENCE TO RELATED APPLICATIONS

This application claims priority under 35 U.S.C. §119(e) to U.S. Provisional Application No. 62/207,704, filed Aug. 20, 2015, and entitled "UNIVERSAL DEMOSAIC." The disclosure of this prior application is considered part of this application, and is hereby incorporated by reference in its entirety.

BACKGROUND OF THE INVENTION

Field of the Invention

The present application relates generally to an apparatus and method for universal demosaicing of single-plane, color image data produced by a digital image sensor overlaid with a Color Filter Array (CFA) for producing a color image.

Description of the Related Art

A demosaicing (also de-mosaicing, demosaicking, or debayering) algorithm is a digital image process used to reconstruct a color image from output from an image sensor overlaid with a CFA. The demosaic process may also be known as CFA interpolation or color reconstruction. Most modern digital cameras acquire images using a single image sensor overlaid with a CFA, so demosaicing may be part of the processing pipeline required to render these images into a viewable format. To capture color images, photo sensitive elements (or sensor elements) of the image sensor may be arranged in an array and detect wavelengths of light associated with different colors. For example, a sensor element may be configured to detect a first, a second, and a third color (e.g., red, green and blue ranges of wavelengths). To accomplish this, each sensor element may be covered with a single color filter (e.g., a red, green or blue filter). Individual color filters may be arranged into a pattern to form a CFA over an array of sensor elements such that each individual filter in the CFA is aligned with one individual sensor element in the array. Accordingly, each sensor element in the array may detect the single color of light corresponding to the filter aligned with it.

The Bayer pattern has typically been viewed as the industry standard, where the array portion consists of rows of alternating red and green color filters and alternating blue and green color filters. Usually, each color filter corresponds to one sensor element in an underlying sensor element array.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages.

In one aspect, a demosaicing system for converting image data generated by an image sensor into an image, is disclosed. The system includes an electronic hardware processor, configured to receive information indicating a configuration of sensor elements of the image sensor and a configuration of filters for the sensor elements, generate a modulation function based on a configuration of sensor elements and the configuration of filters, demodulate the image data based on the generated modulation function to determine chrominance and luminance components of the image data, and generate the image based on the determined chrominance and luminance components.

In some aspects, the electronic hardware processor is further configured to generate a set of configuration parameters based on the modulation function, extract a set of chrominance components from the image data using the set of configuration parameters, demodulate the chrominance components into a set of baseband chrominance components using the set of configuration parameters, modulate the set of baseband chrominance components to determine a set of carrier frequencies, extract a luminance component from the image data using the set of carrier frequencies. The image is generated based on the extracted luminance component and the determined set of baseband chrominance components. The configuration of the image sensor may further comprise one or more of the following a period of filter elements comprising at least one filter element, each filter element comprising a spectral range, and the array of filter elements comprising a repeating pattern of the period of filter elements, a size of each filter element having a length dimension and a width dimension that is different than a respective length dimension and a respective width dimension of a corresponding sensor element of the image sensor, and an array of dynamic range sensor elements, each dynamic range sensor element having an integration time, wherein the integration time controls a level of sensitivity of the corresponding dynamic range sensor element. In some aspects, the determination of the modulation function is based on at least one of the period of filter elements, the size of each filter element, and the array of dynamic range sensor elements.

Another aspect disclosed is a method for converting image data generated by an image sensor into a second image. The method comprises receiving information indicating a configuration of sensor elements of the image sensor and a configuration of filters for the sensor elements, generating a modulation function based on a configuration of sensor elements and the configuration of filters, demodulating the image data based on the generated modulation function to determine chrominance and luminance components of the image data; and generating the second image based on the determined chrominance and luminance components. In some aspects, the method also includes generating a set of configuration parameters based on the determined modulation function, extracting a set of chrominance components from the image data using the set of configuration parameters, demodulating the set of chrominance components into a set of baseband chrominance components using the set of configuration parameters, modulating the set of baseband chrominance components to determine a set of carrier frequencies, and extracting a luminance component from the image data using the set of carrier frequencies, wherein the generation of the second image is based on the extracted luminance component and the set of baseband chrominance components.

In some aspects, the configuration of the image sensor is defined by one or more of the following: a period of filter elements comprising at least one filter element, each filter element comprising a spectral range, and the array of filter elements comprising a repeating pattern of the period of filter elements, a size of each filter element having a length dimension and a width dimension that is different than a respective length dimension and a respective width dimension of a corresponding sensor element of the image sensor, and an array of dynamic range sensor elements, each dynamic range sensor element having an integration time, wherein the integration time controls a level of sensitivity of the corresponding dynamic range sensor element. In some aspects, the determination of the modulation function is based on at least one of the period of filter elements, the size of each filter element, and the array of dynamic range sensor elements.

Another aspect disclosed is a non-transitory computer-readable medium comprising code that, when executed, causes an electronic hardware processor to perform a method of converting image data generated by an image sensor into a second image. The method includes receiving information indicating a configuration of sensor elements of the image sensor and a configuration of filters for the sensor elements, generating a modulation function based on a configuration of sensor elements and the configuration of filters, demodulating the image data based on the generated modulation function to determine chrominance and luminance components of the image data; and generating the second image based on the determined chrominance and luminance components. In some aspects, the method further includes generating a set of configuration parameters based on the determined modulation function; extracting a set of chrominance components from the image data using the set of configuration parameters; demodulating the set of chrominance components into a set of baseband chrominance components using the set of configuration parameters; modulating the set of baseband chrominance components to determine a set of carrier frequencies; extracting a luminance component from the image data using the set of carrier frequencies. The generation of the second image is based on the extracted luminance component and the set of baseband chrominance components.

In some aspects, the configuration of the image sensor is defined by one or more of the following: a period of filter elements comprising at least one filter element, each filter element comprising a spectral range, and the array of filter elements comprising a repeating pattern of the period of filter elements, a size of each filter element having a length dimension and a width dimension that is different than a respective length dimension and a respective width dimension of a corresponding sensor element of the image sensor, and an array of dynamic range sensor elements, each dynamic range sensor element having an integration time, wherein the integration time controls a level of sensitivity of the corresponding dynamic range sensor element. In some aspects, the determination of the modulation function is based on at least one of the period of filter elements, the size of each filter element, and the array of dynamic range sensor elements.

Another aspect disclosed is a demosaicing apparatus for converting a image data generated by an image sensor into a second image. The apparatus includes means for receiving information indicating a configuration of sensor elements of the image sensor and a configuration of filters for the sensor elements, means for generating a modulation function based on a configuration of sensor elements and the configuration of filters, means for demodulating the image data based on the generated modulation function to determine chrominance and luminance components of the image data; and means for generating an image based on the determined chrominance and luminance components.

BRIEF DESCRIPTION OF THE DRAWINGS

FIG. 1 illustrates a simplified example of a 2×2 Bayer CFA pattern with RGB spectral components having a 1:1 ratio to the image sensor components.

FIG. 2 illustrates a simplified example of a 3×3 Bayer CFA pattern with RGB spectral components having a 1.5:1 ratio to the image sensor components.

FIG. 3 illustrates a simplified example of a 4×4 Lukac CFA pattern with RGB spectral components having a 1:1 ration to the image sensor components.

FIG. 4 illustrates an example of a Fourier spectrum representation of FIG. 1.

DETAILED DESCRIPTION

Figure 5:
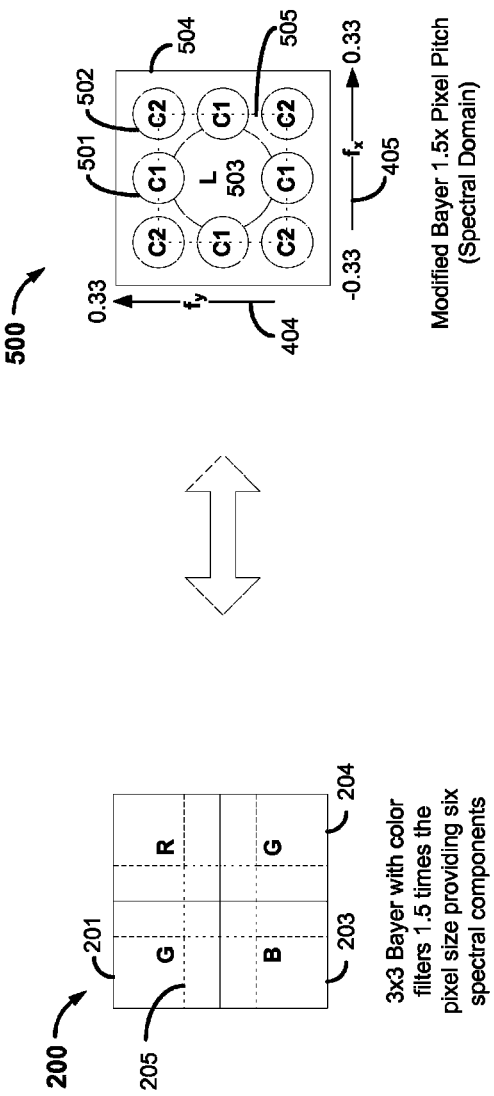
FIG. 5 illustrates an example of a Fourier spectrum representation of FIG. 2.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to, or other than one or more of the aspects set forth herein.

Although the examples, systems, and methods described herein are described with respect to digital camera technologies, they may be implemented in other imaging technology as well. The systems and methods described herein may be implemented on a variety of different photosensitive devices, or image sensors. These include general purpose or special purpose image sensors, environments, or configurations. Examples of photosensitive devices, environments, and configurations that may be suitable for use with the invention include, but are not limited to, semiconductor charge-coupled devices (CCD) or active sensor elements in CMOS or N-Type metal-oxide-semiconductor (NMOS) technologies, all of which can be germane in a variety of applications including, but not limited to digital cameras, hand-held or laptop devices, and mobile devices (e.g., phones, smart phones, Personal Data Assistants (PDAs), Ultra Mobile Personal Computers (UMPCs), and Mobile Internet Devices (MIDs)).

The Bayer pattern is no longer the only pattern being used in the imaging sensor industry. Multiple CFA patterns have recently gained popularity because of their superior spectral-compression performance, improved signal-to-noise ratio, or ability to provide HDR imaging.

Alternative CFA designs that require modified demosaicing algorithms are becoming more ubiquitous. New CFA configurations have gained popularity due to (1) consumer demand for smaller sensor elements, and (2) advanced image sensor configurations. The new CFA configurations include color filter arrangements that break from the standard Bayer configuration and use colors of a spectrum beyond the traditional Bayer RGB spectrum, white sensor elements, or new color filter sizes. For instance, new color filter arrangements may expose sensor elements to a greater range of light wavelengths than the typical Bayer RGB configuration, and may include RGB as well as cyan, yellow, and white wavelengths (RGBCYW). Such arrangements may be included in image sensors with sensor elements of a uniform size. Other arrangements may include a pattern of different sized sensor elements, and thus, different sized color filters. Furthermore, industry demand for smaller sensor elements is creating an incentive to vary the standard 1:1 color filter to sensor element ratio, resulting in color filters that may overlap a plurality of sensor elements.

Non-Bayer CFA sensors may have superior compression of spectral energy, ability to deliver improved signal-to-noise ratio for low-light imaging, or ability to provide high dynamic range (HDR) imaging. A bottleneck to the adaption of emerging non-Bayer CFA sensors is the unavailability of efficient and high-quality color-interpolation algorithms that can demosaic the new patterns. Designing a new demosaic algorithm for every proposed CFA pattern is a challenge.

Modern image sensors may also produce raw images that cannot be demosaiced by conventional means. For instance, High Dynamic Range (HDR) image sensors create a greater dynamic range of luminosity than is possible with standard digital imaging or photographic techniques. These image sensors have a greater dynamic range capability within the sensor elements themselves. Such sensor elements are intrinsically non-linear such that the sensor element represents a wide dynamic range of a scene via non-linear compression of the scene into a smaller dynamic range.

Disclosed herein are methods and systems that provide interpolation and classification filters that can be dynamically configured to demosaic raw data acquired from a variety of color filter array sensors. The set of interpolation and classification filters are tailored to one or more given color filter arrays. In some implementations, the color filters can be pure RGB or include linear combinations of the R, G, and B filters.

The word "exemplary" is used herein to mean "serving as an example, instance, or illustration." Any embodiment described herein as "exemplary" is not necessarily to be construed as preferred or advantageous over other embodiments.

The term "direct integration" may include a power or data connection between two or more components (e.g., a processor and an image sensor) over a wired or wireless connection where the two components transfer and/or receive data in a direct link.

The term "indirect connection" may include a power or data connection over an intermediary device or devices between two or more components (e.g., a processor and an image sensor), or a device that may configure the components, the components having no direct connection to each other.

The term "substantially" is used herein to indicate within 10% of the measurement expressed, unless otherwise stated.

The words "color filter array," "filter array," and "filter element" are broad terms and are used herein to mean any form of filtering technology associated with filtering spectrums of electromagnetic radiation, including visible and non-visible wavelengths of light.

The term "color filter array" or CFA may be referred to as a "filter array," "color filters," "RGB filters," or "electromagnetic radiation filter array." When a filter is referred to as a red filter, a blue filter, or a green filter, such filters are configured to allow light to pass through that has one or more wavelengths associated with the color red, blue, or green, respectively.

The term "respective" is used herein to mean the corresponding apparatus associated with the subject. When a filter is referenced to a certain color (e.g., a red filter, a blue filter, a green filter) such terminology refers to a filter configured to allow the spectrum of that color of light to pass through (e.g., wavelengths of light that are generally associated with that color).

FIG. 1 illustrates a first example configuration of a traditional 2×2 Bayer CFA pattern 100 using a standard 1:1 size ratio of RGB color filter to sensor element. The CFA pattern 100 is a square made up of four smaller squares 101-104, wherein each of the four smaller squares 101-104 is representative of both an individual sensor element and an individual color filter. A first sensor element 101 is labeled with the letter "G" signifying a green color filter overlaying the first sensor element 101. A second sensor element 102 is labeled with an "R" signifying a red color filter overlaying the second sensor element 102. A third sensor element 103 labeled with the letter "B" signifying a blue color filter overlaying the third sensor element 103. A fourth sensor element 104 labeled again with the letter "G" signifying the green color overlaying the fourth sensor element 104.

Image sensor configuration 100 includes color filter elements that have length and width dimensions that are substantially equal to the length and width dimensions of the sensor elements (101, 102, 103, 104).

FIG. 2 illustrates a second example configuration 200 of a 3×3 sensor element array 205 with a Bayer color filter configuration. The Bayer color filter configuration 200 includes Bayer color filter elements that are 1.5 times the sensor element size. The configuration 200 is composed of nine smaller squares outlined with dashed lines, the smaller squares representing sensor elements in a 3×3 configuration. Overlaying the 3×3 sensor element array 205 is a 2×2 pattern of larger squares made up of solid lines, each larger square representing a color filter element and labeled with an alphabetical letter. The first filter element 201 labeled "G" allows a spectrum of green light to pass. The second filter element 202 labeled "R" allows a spectrum of red light to pass. A third filter element 203 labeled "B" allows a spectrum of blue light to pass. A fourth filter element 204 labeled "G" allows a spectrum of green light to pass.

The filter elements in configuration 200 may have a length and width dimension that is 1.5× greater than the corresponding length and width dimension of the sensor element, thus providing a broader spectral range than the 2×2 Bayer CFA pattern 100.

FIG. 3 illustrates a third example configuration 300 of a 4×4 sensor element array with a Lukac pattern using the standard 1:1 size ratio of RGB color filter to sensor element. The configuration 300 includes up of sixteen sensor elements 301-316, organized in a 4×4 configuration. Elements 301-316 are labeled with "G", "R", or "B", indicating they are overlaid with green, red, or blue color filters respectively.

The example configurations of FIGS. 1, 2, and 3 may each be described as a period of filter elements. The periodic arrangement of filter elements represents an irreducible minimum pattern that may be duplicated a number of times and overlaid upon an image sensor array to create a CFA for use with (and/or incorporated with) an image sensor. The periodic arrangement of filter elements may comprise one or more filter elements, each filter element having configured to allow a wavelength, or a range of wavelengths, of light pass through the filter element.

Information of an image sensor configuration may include a size of each filter element in the CFA, periodicity of filter elements, the size of each filter element, and/or the size of each sensor element. The each filter element can be defined as having a length dimension and a width dimension. A corresponding sensor element or sensor elements) may have a substantially identical width and length dimension, or different dimensions. Additionally, an image sensor may be configured to include an array of dynamic range sensor elements, each dynamic range sensor element having an integration time where the integration time controls the effective sensitivity of the sensor elements to exposed radiation.

FIG. 4 illustrates a single plane spectral image 400 for the first example configuration of the traditional 2×2 Bayer CFA pattern 100 using the standard 1:1 size ratio of RGB color filter to sensor element, described above. The single pane spectral image 400 may also be referred to in mathematical terms as y[n] throughout this disclosure. The single plane spectral image 400 is represented by a square 406 of equal length and width. The square 406 may represent a frequency plane on a Fourier domain where the edges of the square 406 are representative of the limitations of the frequency range for the example 2×2 Bayer CFA pattern 100. The frequency range of the square has an x-axis and a y-axis property shown by the $f_x$ 404 and $f_y$ 405 arrows, respectively.

Along the four perimeter edges of the square 406 are example first and second chrominance components 401 and 402 of the single plane spectral image 400. Chrominance components 401 and 402 indicate example areas where the chrominance channels exist in the Fourier domain. A luminance component 403 indicates an example area of luminance magnitude in the Fourier domain. In this example, the chrominance components 401 402 and luminance components 403 are presented to make identification of the spectral frequency corresponding to the luminance component 403 and chrominance components (401, 402) easily visible. The single plane spectral image 400 illustrated may also be referred to as the $LC_1C_2$ domain.

The single plane spectral image 400 of FIG. 4 illustrates an example Bayer CFA spectrum produced by the 2×2 Bayer CFA pattern 100 discussed above. FIG. 4 exemplifies how the location and size of the period of color filters relative to the sensor elements that define this particular image sensor configuration 100 affect the frequency domain representation of the CFA signal of the output image 400. In this case, the frequency domain representation of the example Bayer CFA spectrum 400 comprises a luminance component 403 at the baseband frequency (e.g., (0, 0)), and a set of first chrominance components 401 and second set chrominance components 402. Here, the luminance component 403 resides in the baseband of the spatial domain at the spatial frequency (0, 0), while the C1 401 components may reside at the (0, 0.5), (0.5, 0), (0, −0.5), and (−0.5, 0) frequencies and the C2 602 components may reside at the (−0.5, 0.5), (0.5, 0.5), (0.5, −0.5), and (−0.5, −0.5) frequencies. However, FIG. 4 is just one example, and a variety of image sensor configurations may result in raw images with a variety of single plane spectral images with a variety of CFA spectrums.

FIG. 5 illustrates an example single plane spectral image 500 derived from the second example configuration 200 having the 3×3 sensor element array 205 with a Bayer color filter configuration. The single plane spectral image 500 includes a large outer square 504 containing a smaller square 505. The frequency range of the square 504 has an x-axis and a y-axis property shown by the $f_x$ 405 and $f_y$ 404 arrows, respectively. The large outer square 504 may represent a frequency plane on a Fourier domain where the edges of the square 504 are representative of the limitations of the frequency range for the example 3×3 sensor element array 205 with a Bayer color filter configuration. The smaller square 505 represents the spatial frequency range of the single plane spectral image 500 that may contain a first chrominance component 501 and a second chrominance component 502 of the single plane spectral image 500. A luminance component 503 indicates an example area of luminance magnitude in the Fourier domain. The single plane spectral image 500 illustrated may also be referred to as the $LC_1C_2$ domain.

FIG. 5 shows that the luminance component 503 occupies the baseband frequency range while the first chrominance components 501 and second chrominance components 502 are modulated at the frequency limitations of the smaller square 505. In the case of the 3×3 sensor element array 205 with Bayer configured color filters being 1.5 times the size of the sensor elements 200, the chrominance components may be located in the frequency plane at a spatial frequency range of −0.33 to 0.33. For example, the first channel chrominance components 501 may reside at (0, 0.33), (0.33, 0), (0, −0.33), and (−0.33, 0) frequencies and the second channel chrominance components 502 may reside at the (−0.33, 0.33), (0.33, 0.33), (0.33, −0.33), and (−0.33, −0.33) frequencies. It is noted that in this single plane spectral image 500 there may exist interference or crosstalk between the luminance component 503 and the chrominance components 501, 502. The crosstalk can be strongest between the luminance component 503 and the first chrominance components 501.

Figure 6:
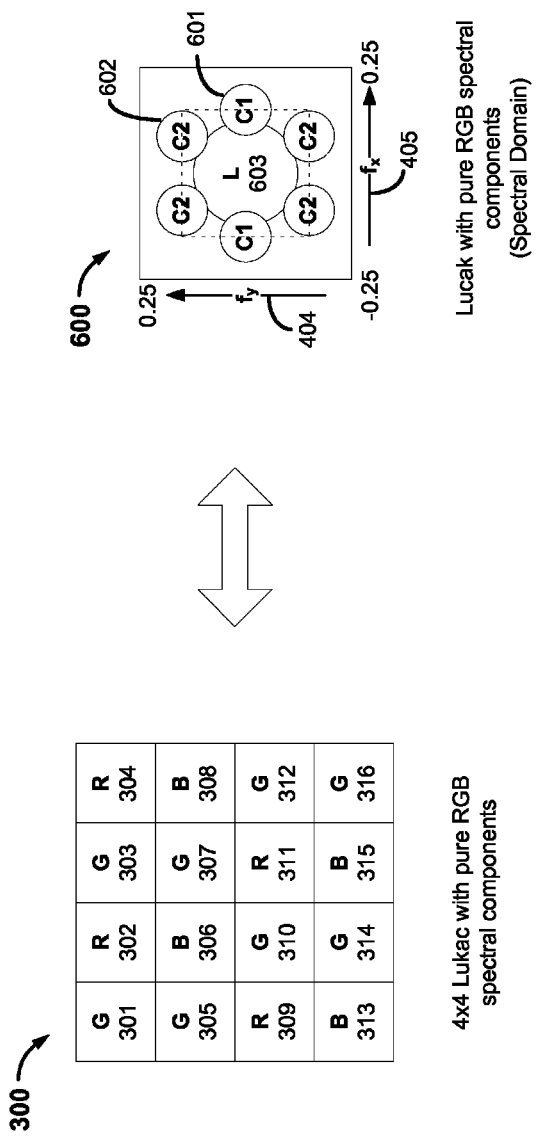
FIG. 6 illustrates an example of a Fourier spectrum representation of FIG. 3.

FIG. 6 illustrates an example of a single plane spectral image 600 for the 4×4 sensor element array 300 with a Lukac pattern using the standard 1:1 size ratio of RGB color filter to sensor element, described above. The single plane spectral image 600 is represented with a large outer square 504 containing a smaller square 505. The smaller square 505 represents a spatial frequency range of the single plane spectral image 600. Along the four perimeter edges of the square 505 are chrominance components 501 502 of the single plane spectral image 600. The chrominance components are organized in a hexagonal formation, and represented as two color-difference components labeled as C1 601 and C2 602. Both horizontally oriented sides, or segments of the smaller square contain two chrominance components, both labeled C2 602, with each component situated toward the ends of the segments. Both vertically oriented sides, or segments of the smaller square contain one chrominance component, each labeled C1 601, with each component situated in the middle of the segment. Situated in the middle of the smaller square is a single circle representing the luminance component 603 indicating an example area of magnitude where the luminance component 603 exists in the Fourier domain. The single plane spectral image 400 illustrated may also be referred to as the $LC_1C_2$ domain. This circle is labeled with an L. The frequency range of the square has an x-axis and a y-axis property shown by the $f_x$ 604 and $f_y$ 605 arrows, respectively.

FIG. 6 illustrates that the luminance occupies the baseband while the chrominance is modulated at the frequency limitations of the spatial frequency range of the single plane spectral image 600, represented by the smaller square. In some aspects of the configuration of the 4×4 sensor element array 300, the chrominance may be located in the frequency plane at a spatial frequency range of −0.25 to 0.25. For example, in some aspects, chrominance component C1 may be modulated at spatial frequencies (0, 0), and the second chrominance component C2 may be modulated at spatial frequencies (−0.25, 0.25). The single plane spectral image 600 includes interference or crosstalk between components and the crosstalk may be strongest between the luminance 603 and the modulated chrominance components C1 and C2.

Figure 7:
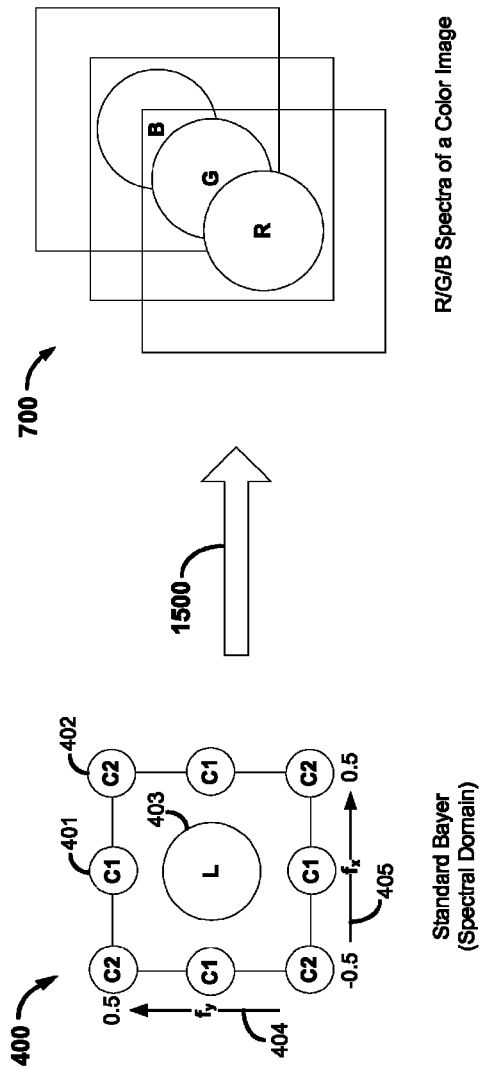
FIG. 7 illustrates an example of a Fourier spectrum representation of FIG. 1 and an example resulting product of a demosaicing process.

FIG. 7 illustrates demosaicing of the single plane spectral image 500. In this example, the single plane spectral image 500 is processed by a method 1300, discussed with reference to FIG. 13A below, to produce a triple plane RGB image 700. The demosaiced image 700 that results from demosaic method 1300 may include a triple plane RGB image 700, but this example should not be seen as limiting. The resulting demosaiced image may be any color model (e.g., CMYK) and may exist in a plurality of spectral planes, or a single plane.

Further to the example in FIG. 7, the demosaic method 1300 generally uses an image sensor configuration defined by a period of a CFA pattern to convert the data points corresponding to the chrominance components 401, 402 and luminance component 403 of the single plane spectral image 400 produced by the image sensor using that particular CFA pattern. Equation 1 below enables expression of the CFA pattern y[$\underline{n}$] in terms of the luminance component 403 and chrominance components 401, 402 $\underline{n}=[n_1, n_2]$ where $\underline{n}$ represents an address to a spatial coordinate on an two-dimensional square lattice 404 having a horizontal position ($n_1$) and a vertical position ($n_2$). Using the Bayer CFA pattern 100 as an example, a data value at point $\underline{n}$ can be represented by the following equation:

$$y[\underline{n}]=l[\underline{n}]+((-1)^{n_1}-(-1)^{n_2})c_1[\underline{n}]+(-1)+(-1)^{n_1+n_2}c_2[\underline{n}] \quad (1)$$

Where:
y[$\underline{n}$]: CFA data value at point $\underline{n}=[n_1, n_2]$,
l[$\underline{n}$]: luminance value at point $\underline{n}=[n_1, n_2]$,
$c_1[\underline{n}]$: chrominance value at point $\underline{n}=[n_1, n_2]$,
$c_2[\underline{n}]$: chrominance value at point $\underline{n}=[n_1, n_2]$.

As an example, an $LC_1C_2$ to RGB transformation of the Bayer CFA pattern 100 can be given by:

$$\begin{bmatrix} L \\ C_1 \\ C_2 \end{bmatrix} = \frac{1}{4}\begin{bmatrix} 1 & 2 & 1 \\ -1 & 0 & 1 \\ -1 & 2 & -1 \end{bmatrix}\begin{bmatrix} R \\ G \\ B \end{bmatrix}. \quad (2)$$

Where:
L: Luminance component of a single plane spectral image,
$C_1$: First color channel chrominance component of a single plane spectral image,
$C_2$: Second color channel chrominance component of a single plane spectral image, and
R, G, B: Red, Green, Blue.

Taking the Fourier transform of equation 1, the Bayer CFA pattern 100 can be represented in the spectral domain as:

$$Y(\underline{f}) = L(\underline{f}) + C_1\left(\underline{f} - \begin{bmatrix} \frac{1}{2} \\ 0 \end{bmatrix}\right) - C_1\left(\underline{f} - \begin{bmatrix} 0 \\ \frac{1}{2} \end{bmatrix}\right) + C_2\left(\underline{f} - \begin{bmatrix} \frac{1}{2} \\ \frac{1}{2} \end{bmatrix}\right). \quad (3)$$

Thus, a spatial domain modulation function $((-1)^{n_1}-(-1)^{n_2})$ encodes the first channel chrominance component 401, C1 in a two-dimensional carrier wave with normalized frequencies (½, 0) and (0, ½) and another spatial-domain modulation function $(-1)^{n_1 n_2}$ encodes the second channel chrominance component 402, C2 in a two-dimensional carrier wave with the normalized frequency (½, ½). Deriving the equivalent equations (1) to (3) above for an arbitrary CFA pattern is discussed below.

Figure 8:
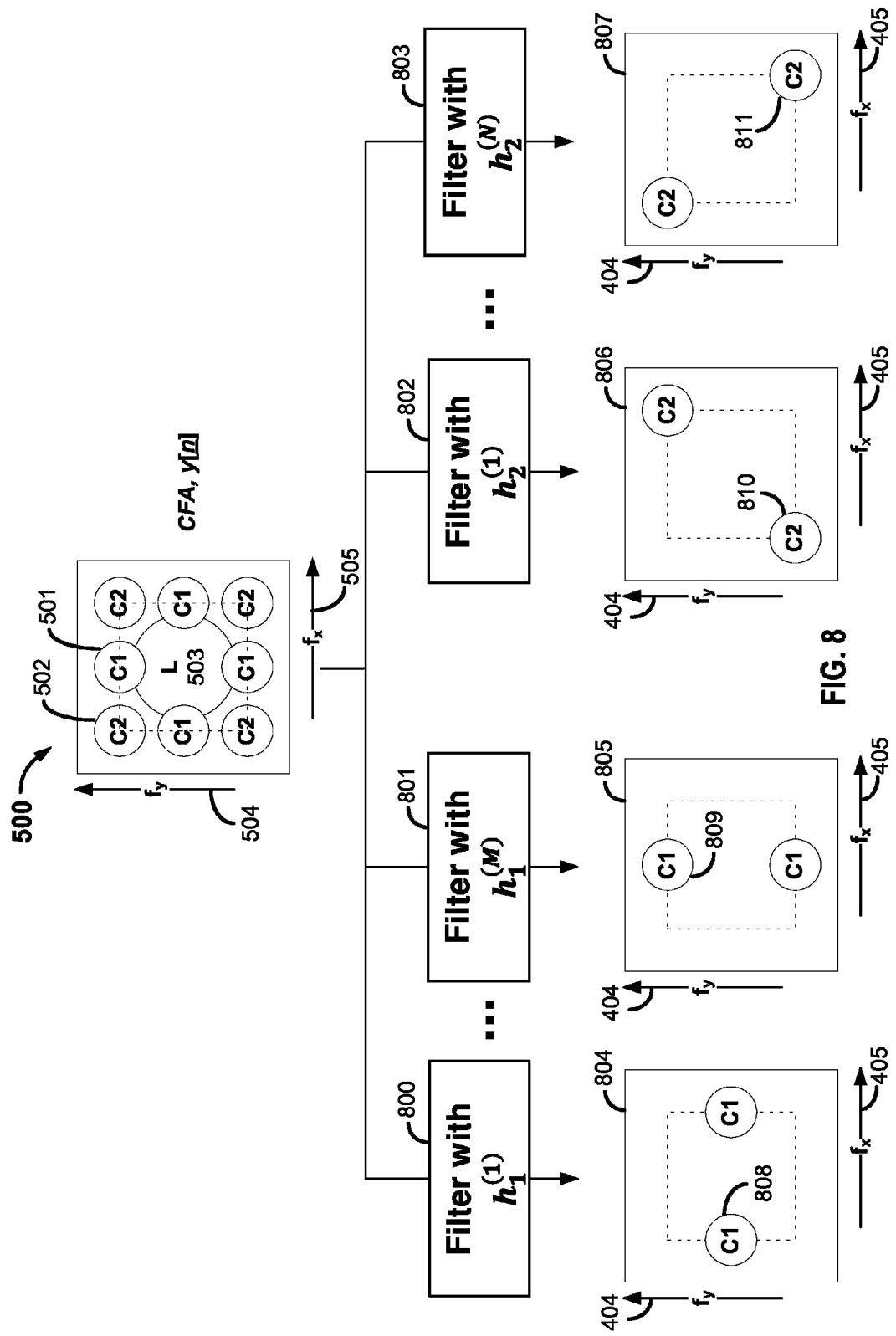
FIG. 8 illustrates a simplified example of a process for extracting chrominance components from a Fourier spectrum representation of FIG. 2.

FIG. 8 illustrates an example method for filtering a single plane spectral image 500 to extract the chrominance components 501, 502 using a filter set 800, 801, 802, 803. In this example embodiment, the filter set 800, 801, 802, 803 may be a pair of high-pass filters $h_1^\lambda[\underline{n}]$ and $h_2^\lambda[\underline{n}]$ adapted to a specific CFA pattern. To extract modulated chrominance components, $$c_{1m}^\lambda[\underline{n}] \triangleq m_{C_1}^\lambda[\underline{n}]c_1[\underline{n}] \text{ and } c_{2m}^\lambda[\underline{n}] \triangleq m_{C_2}^\lambda[\underline{n}]c_2[\underline{n}] \quad (4)$$

for each $\lambda \in \hat{\Lambda}^*_M \backslash (0,0)$ from a given CFA pattern y[$\underline{n}$]. In some aspects, the filtering equations may be $$c_{im}^\lambda[\underline{n}] = \sum_{\underline{m}} y[\underline{n}]h_i^\lambda[\underline{n}-\underline{m}], i = 1, 2. \quad (5)$$

Where:
$c_{im}^\lambda[\underline{n}]$: extracted chrominance component at color channel i of point $\underline{n}$,
y[$\underline{n}$]: CFA data value at point $\underline{n}=[n_1, n_2]$,
$h_i^\lambda[\underline{n}-\underline{m}]$: high pass filter for point $\underline{n}-\underline{m}$, an address of a point in the Fourier domain described as a difference used to index the filter coefficient, indicative of a spatially invariant filter (i.e., a pattern consistent throughout the sensor),
$\underline{n}$: a point that neighbors point $\underline{m}$ in a first image represented in a Fourier spectrum, and m: a point in the spectral domain, an integer on a 2d grid (x,y), the 2d grid being the spectral domain of a Fourier transform.

In this example, the initial high pass filter ($h_1^{(1)}$) may filter a horizontal set of chrominance components while the proceeding filer ($h_1^{(M)}$) may filter a vertical set of chrominance components from the frequency domain.

Figure 9:
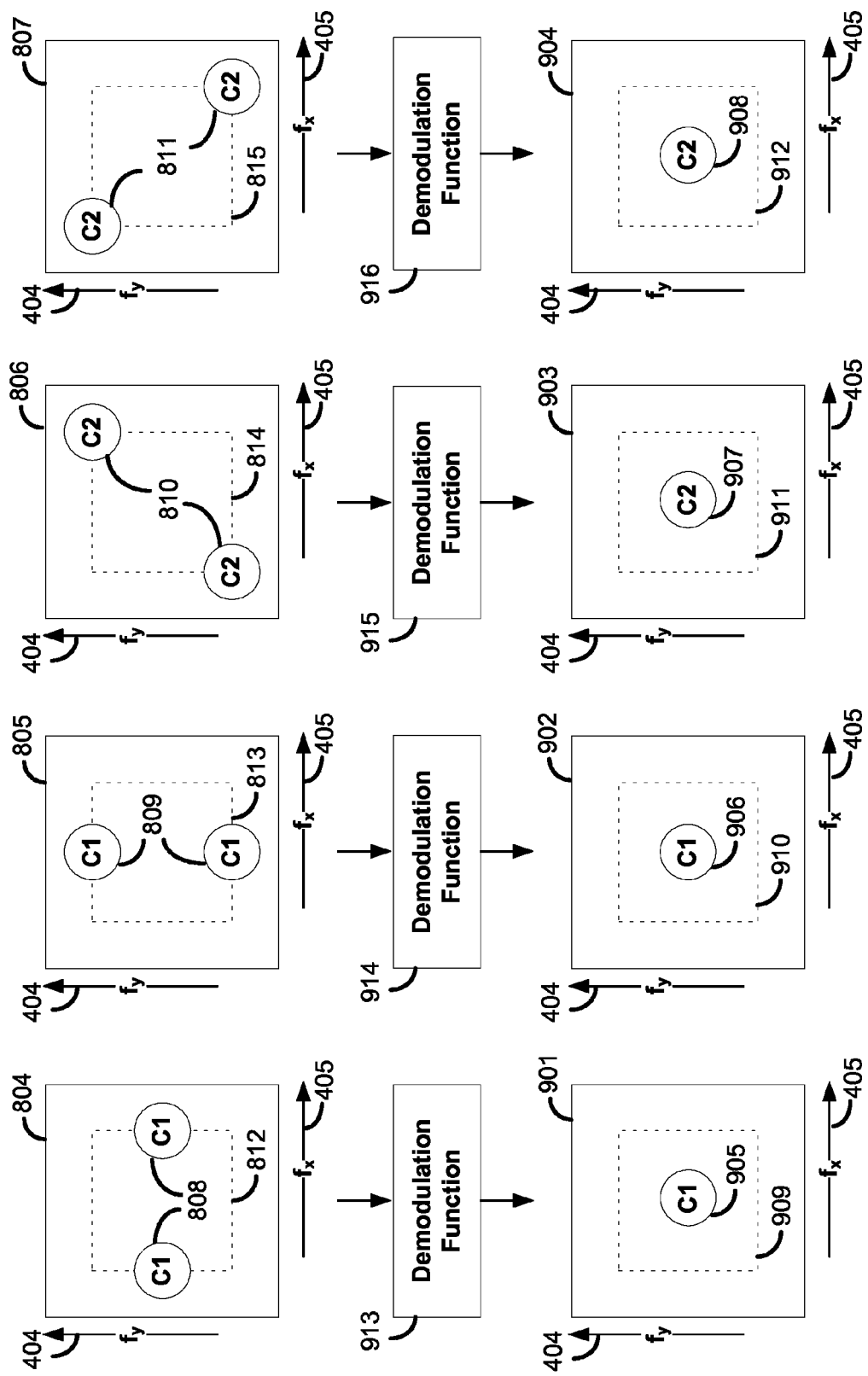
FIG. 9 illustrates a simplified example of a process for demodulating a set of chrominance components to the baseband of the Fourier spectrum.

FIG. 9 illustrates using a demodulation function to modulate the extracted chrominance components 804, 805, 806, 807 from FIG. 8 into baseband chrominance components 901, 902, 903, 904. This may be accomplished by using the analytically derived modulation functions $m_{C_1}^{\lambda}[\underline{n}]$ and $m_{C_1}^{\lambda}[\underline{n}]$. The demodulation operation is described by equation 6 as shown below:

$$\vec{c}_i^{\lambda}[\underline{n}] = \begin{cases} \dfrac{\vec{c}_{im}^{\lambda}[\underline{n}]}{m_{C_i}^{\lambda}[\underline{n}]}, & m_{C_i}^{\lambda}[\underline{n}] \neq 0 \\ 0 & m_{C_i}^{\lambda}[\underline{n}] = 0 \end{cases}, i = 1, 2. \quad (6)$$

Where:

$\vec{c}_{im}^{\lambda}[\underline{n}]$: extracted chrominance component at point $\underline{n}$, where the channel of the component equals i, $m_{C_i}^{\lambda}[\underline{n}]$ modulation function for a chrominance channel, the channel being equal to i.

FIG. 9 illustrates the demodulation of the chrominance components extracted using the high pass filtering derived from the modulation function into a set of baseband chrominance components. As described above, the extracted chrominance components comprise the vertical and horizontal aspects of C1, and the diagonal aspects of C2. Similar to the Fourier representation 500 in FIG. 5, the extracted chrominance components are illustrated as four squares 804, 805, 806, 807, each square a Fourier representation of an image produced by the Bayer 3×3 sensor element array 200 in FIG. 2. The four squares 804, 805, 806, 807 each contain a smaller square 812, 813, 814, 815 respectively, where the smaller square 812, 813, 814, 815 represents the spatial frequency range of the single plane spectral image 500 that may contain the chrominance components of the image. Along two of the four perimeter edges of the interior smaller square 812 of the first square 804 are two circles 808 representing the chrominance components of the single plane spectral image 500. These circles 808 represent the horizontal C1 components, the C1 components on the left and right sides of the smaller square 812. Along two of the four perimeter edges of the interior smaller square 813 of the second square 805 are circles 809 representing the chrominance components of the single plane spectral image 500. These circles 809 represent the vertical C1 components, the C1 components on the top and bottom sides of the smaller square 813. Situated upon two of the four corners of the interior smaller square 814 of the third square 806 are circles 810 representing the chrominance components of the single plane spectral image 500. These circles 810 represent the diagonal C2 components, the C2 components occupying the top right corner and the bottom left corner of the smaller square 814. Situated upon two of the four corners of the interior smaller square 815 of the fourth square 807 are circles 811 representing the chrominance components of the single plane spectral image 500. These circles 811 represent another set of diagonal C2 components, the C2 components occupying the top left corner and the bottom right corner of the smaller square 815.

FIG. 9 further illustrates the set of baseband chrominance components 901, 902, 903, 904 following demodulation of the extracted chrominance components 804, 805, 806, 807, respectively. For example, the first baseband chrominance component 905 is represented by a large square 901 that houses a smaller square 909. Following a demodulation function 913, the set of chrominance components 808 in the first set of extracted chrominance components 804 are merged into a baseband chrominance component 905. However, in contrast to the corresponding extracted chrominance components 808, the baseband chrominance component contains a single chrominance component 905 residing at the baseband frequency, and labeled as C1, referring to a first color channel chrominance component 905. Similarly, a second baseband chrominance component 906 is represented by a large square 902 that houses a smaller square 910. Following a demodulation function 914, the set of chrominance components 809 in the first set of extracted chrominance components 805 are merged into a baseband chrominance component 906. However, in contrast to the corresponding extracted chrominance components 809, the baseband chrominance component contains a single chrominance component 906 residing at the baseband frequency, and labeled as C1, referring to a first color channel chrominance component 906.

Further to FIG. 9, a third baseband chrominance component 907 is represented by a large square 903 that houses a smaller square 911. Following a demodulation function 915, the set of chrominance components 810 in the first set of extracted chrominance components 806 are merged into a baseband chrominance component 907. However, in contrast to the corresponding extracted chrominance components 810, the baseband chrominance component contains a single chrominance component 907 residing at the baseband frequency, and labeled as C2, referring to a second color channel chrominance component 907. Similarly, a fourth baseband chrominance component 908 is represented by a large square 904 that houses a smaller square 912. Following a demodulation function 916, the set of chrominance components 811 in the first set of extracted chrominance components 807 are merged into a baseband chrominance component 908. However, in contrast to the corresponding extracted chrominance components 811, the baseband chrominance component contains a single chrominance component 908 residing at the baseband frequency, and labeled as C2, referring to a second color channel chrominance component 908.

Figure 10:
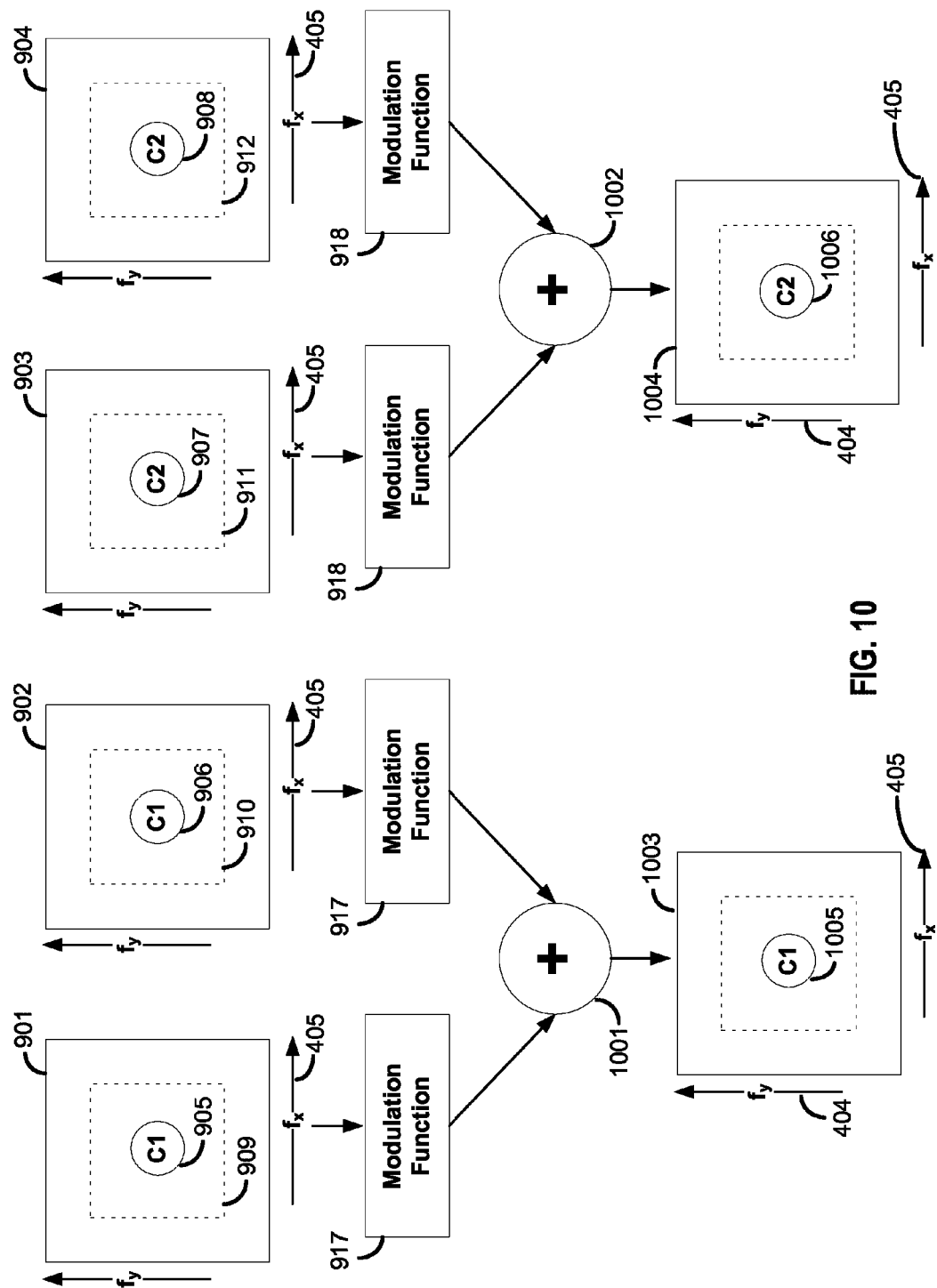
FIG. 10 illustrates a simplified example of a first step for modulating a set of baseband chrominance components to acquire a set of associated carrier frequencies.

FIG. 10 illustrates an example modulation 917, 918 to merge the multiple baseband chrominance components 905, 906, 907, 908 into a single baseband chrominance component 1005, 1006 for each one of two color channels. FIG. 10 includes the set of a first baseband chrominance component 905, a second baseband chrominance component 906, a third baseband chrominance component 907, and a fourth baseband chrominance component 908 described above with respect to FIG. 9, and also includes a set of modulation functions. The baseband chrominance components of the first color channel 905, 906 may be modulated by the same modulation function, or alternatively, may be modulated using a separate set of modulation functions based on a different set of frequencies or coefficients according to the image sensor configuration. In this example, the modulation functions for the first color channel 917 are identical, as well as the modulation functions for the second color channel 918. FIG. 10 also includes two instances of a circle with a plus sign (+) in the middle indicating a function of summation of the modulated components from the first color channel, and summation of the modulated components of the second color channel. As a result of a first summation 1001 of first channel baseband chrominance components 905, 906, a first channel chrominance carrier frequency 1005 may be generated. Similarly, as a result of a second summation 1002 of second channel baseband chrominance components 907, 908, a second channel chrominance carrier frequency 1006 may be generated. The baseband signals may be expressed with the following equation:

$$\widehat{c_{im}}[n] = \sum_{\lambda \in \hat{\Lambda}_M^* \setminus (0,0)} \hat{c}_i[n] m_{C_i}^\lambda[n], \, i = 1, 2 \qquad (7)$$

Where:
$\widehat{c_{im}}[n]$: the modulated baseband chrominance signal for each color channel of the chrominance components,
$\hat{c}_i[n]$: the baseband chrominance signal for each color channel of the chrominance components,
$m_{C_i}^\lambda[n]$: the modulation function representative of the period of the CFA pattern.

Figure 11:
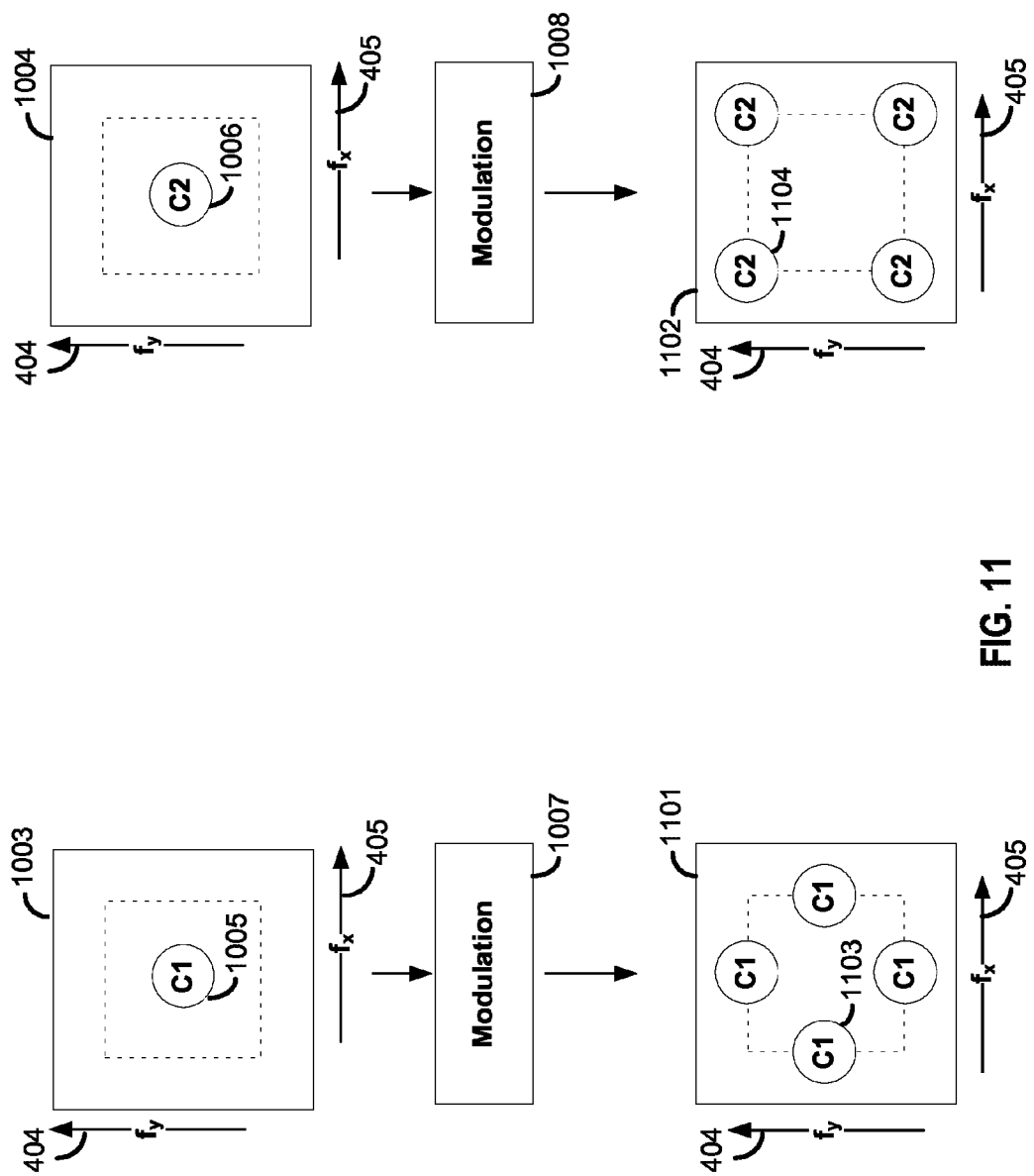
FIG. 11 illustrates a simplified example of a second step for modulating a set of baseband chrominance components to acquire a set of associated carrier frequencies.

FIG. 11 illustrates the two chrominance carrier frequencies for the first color channel 1005 and the second color channel 1006 described above, as well as a modulation function 1007 for the first color channel chrominance component and a modulation function 1008 for the second color channel chrominance component. The first color channel chrominance component 1005 may be modulated to create the full first channel chrominance component 1101. Similarly, the second color channel chrominance component 1006 may be modulated to create the full second channel chrominance component 1102.

Figure 12:
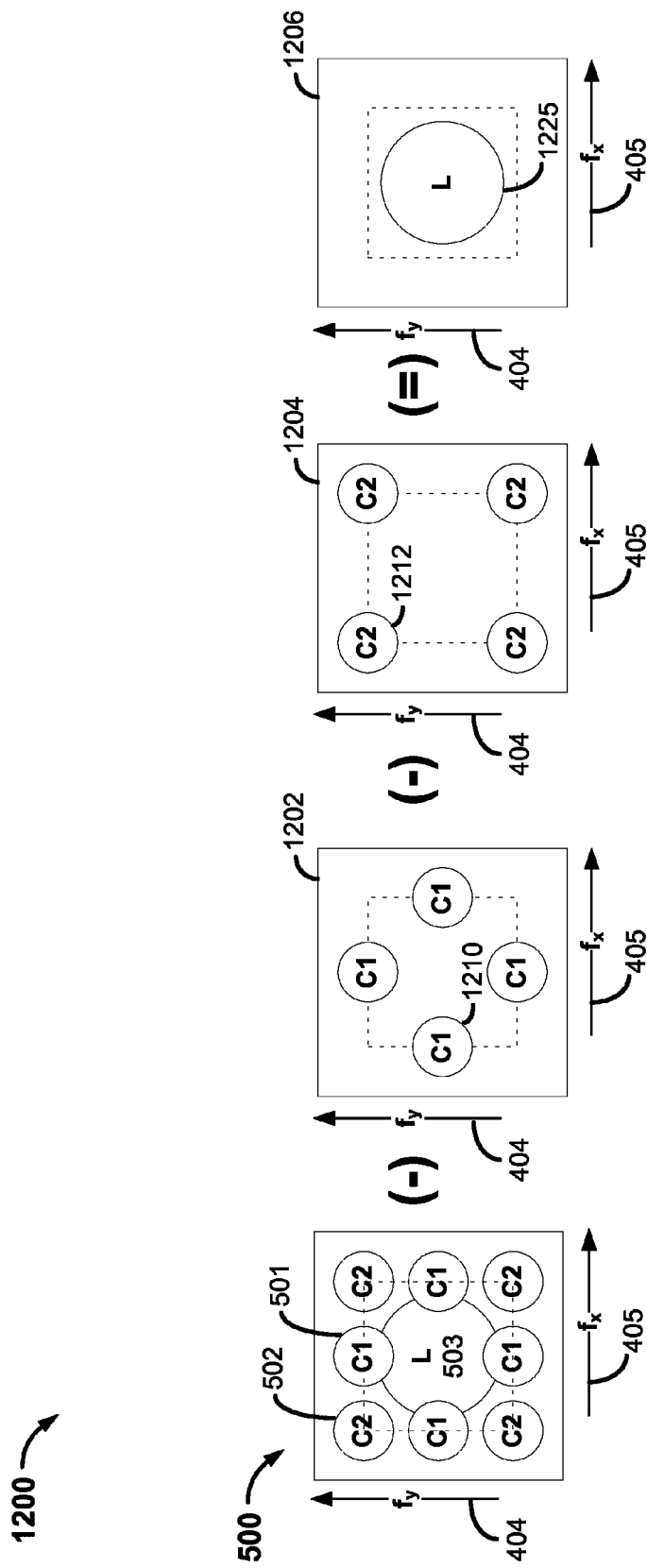
FIG. 12 illustrates a simplified process of estimating the luminance channel in the Fourier spectrum.

FIG. 12 schematically illustrates an example extraction process 1200 that extracts the luminance component 1225 from the single plane spectral image 500 produced by the 3×3 Bayer pattern 200 illustrated in FIG. 2. In a first part 1202 of the extraction process 1200, a first chrominance component 1210 is extracted from the single plane spectral image 500. In a second part 1204 of the extraction process 1200, a second chrominance component 1212 is extracted from the single plane spectral image 500.

Block 1206 includes a baseband luminance component 1225 for the full-channel image which may be estimated using the following equation:

$$l[n] = y[n] - \widehat{c_{1m}}[n] - \widehat{c_{2m}}[n] \qquad (8)$$

Where:
$\widehat{c_{1m}}[n]$: the modulated baseband chrominance signal 1210 for the first color channel of the chrominance components,
$\widehat{c_{2m}}[n]$: the baseband chrominance signal 1210 for the second color channel of the chrominance components,
l[n]: the estimated baseband luminance component 1225.

Figure 13A:
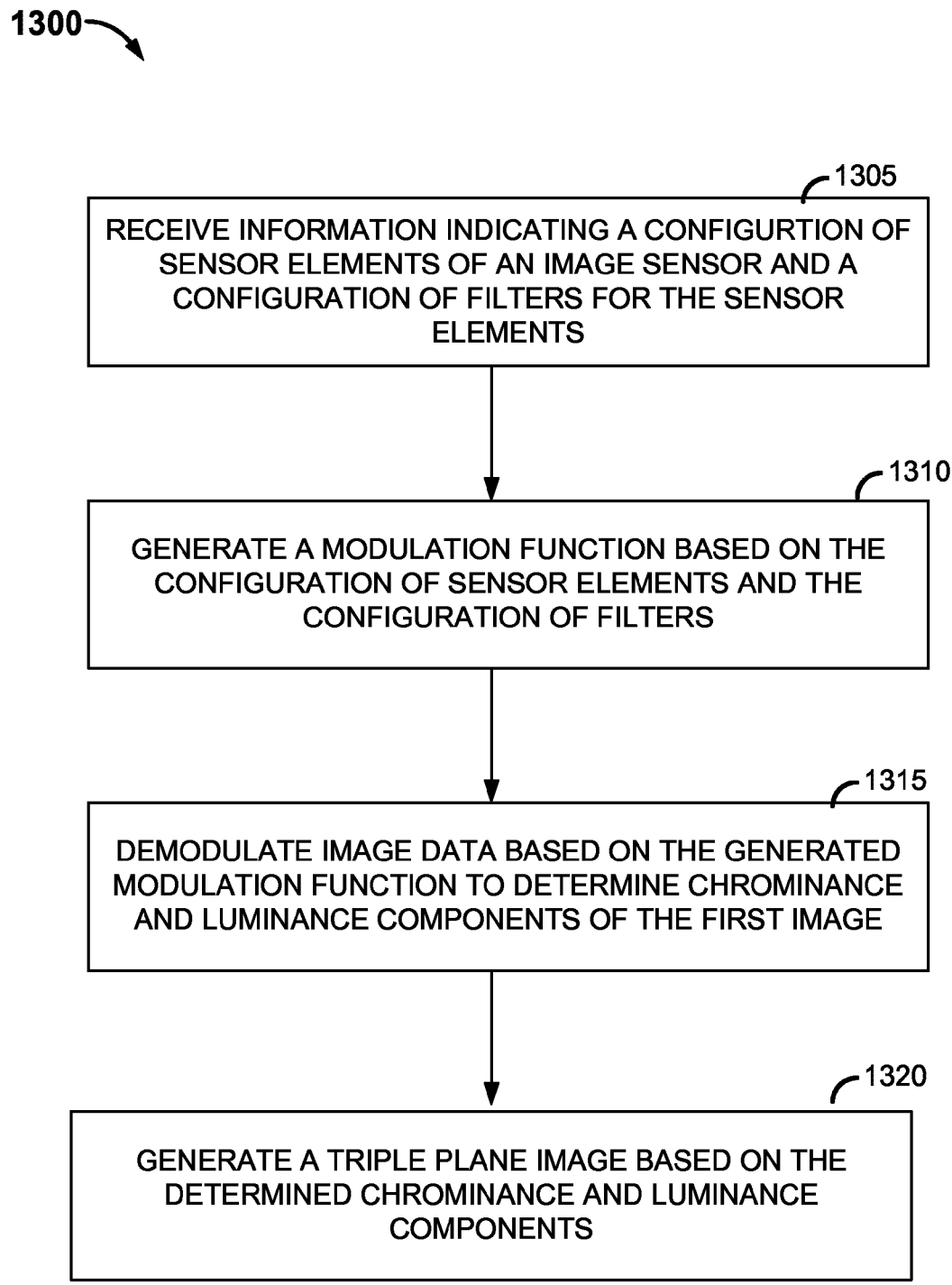
FIG. 13A is a flowchart of a method for converting a image data generated by an image sensor into a second image.

FIG. 13A illustrates a flowchart of an example of a process 1300 for converting image data generated by an image sensor into a second image. In some aspects, the image data may comprise any of the images 100, 200, or 300 discussed above. In some aspects, the image data may be any single plane image, with any configuration of image sensor elements and overlying color filters. In some aspects, the image data may be just a portion of a complete image, such as a portion of images 100, 200, or 300 discussed above.

As discussed above, the Bayer pattern is no longer the dominant color filter array (CFA) pattern in the sensor industry. Multiple color filter array (CFA) patterns have gained popularity, including 1) color filter arrangements e.g. white pixel sensors, Lucas, PanChromatic, etc.; (2) color filter size based, e.g. configurations including a color filter that is 2× the pixel size, configurations including color filters that are 1.5× pixel size, etc; and (3) exposure based high dynamic range (HDR) sensors. Process 1300 provides a hardware-friendly universal demosaic process that can demosaic data obtained from virtually any color filter array pattern.

Given an arbitrary CFA pattern, process 1300 may first determine a spectrum of the CFA image. The CFA spectrum demonstrates that mosaicking operation is, essentially a frequency modulation operation. In some aspects, a luminance component of the image resides at baseband while chrominance components of the image are modulated at high frequencies. After the CFA spectrum is derived, process 1300 may derive modulating carrier frequencies and modulating coefficients that may characterize a forward mosaicking operation. Given the modulating carrier frequencies and coefficients, process 1300 may then derive one or more of spatial-domain directional filters, spatial-domain modulation functions, and spatial-domain demodulation functions for performing a demosaic operation.

In some aspects, process 1300 may be implemented by instructions that configure an electronic hardware processor to perform one or more of the functions described below. For example, in some aspects, process 1300 may be implemented by the device 1600, discussed below with respect to FIG. 14. Note that while process 1300 is described below as a series of blocks in a particular order, one of skill in the art would recognize that in some aspects, one or more of the blocks describes below may be omitted, and/or the relative order of execution of two or more of the blocks may be different than that described below.

Block 1305 receives information indicating a configuration of sensor elements of an image sensor and a configuration of filters for the sensor elements. For example, the information received in block 1305 may indicate the image sensor configuration is any one of configurations 100, 200, 300 discussed above. The image sensor configuration may alternatively be any other sensor configuration. In some implementations, the image sensor configuration may comprise an array of sensor elements, each sensor element having a surface for receiving radiation, and each sensor element being configured to generate the image data based on radiation that is incident on the sensor element. The image sensor configuration may include a CFA pattern that includes an array of filter elements disposed adjacent to the array of sensor elements to filter radiation propagating towards sensor elements in the array of sensor elements.

In some aspects, the image sensor configuration may be dynamically derived in block 1305. In some embodiments, the image sensor configuration may be determined using information defining the CFA pattern (e.g., arrangement of the CFA, periodicity of a filter element in a repeated pattern of the CFA, a length dimension of a filter element, a width dimension of a filter element) corresponding to the array of sensor elements. In one exemplary embodiment, determining an image sensor configuration may include a processor configured to receive information from which a hardware configuration of the image sensor (including the CFA) is determined. In some examples, a processor may receive information indicative of an image sensor hardware configuration and determine the hardware information by accessing a look-up table or other stored information using the received information. In some exemplary embodiments, the image sensor may send configuration data to the processor. In still another exemplary embodiments, one or more parameters defining the image sensor configuration may be hard coded or predetermined and dynamically read (or accessed) from a storage location by an electronic processor performing process 1300.

Block 1310 generates a modulation function based on an image sensor configuration, which includes at least the information indicating the configuration of sensor elements of the image sensor and the configuration of filters for the sensor elements. The variety of example image sensor configurations discussed above may allow generation of a set of sub-lattice parameters unique to a particular one image sensor configuration. The sub-lattice parameters of a given image sensor configuration are a set of properties of the image sensor, and one or more of the set of properties may be used to generate an associated modulation function for the image sensor configuration. In some aspects, the sub-lattice parameters may be used to generate one or more modulation frequencies and/or a set of modulation coefficients. One or more of these generated components may be used to demosaic raw image data output by the particular image sensor. The sub-lattice parameters may be made up of one or more of the following components:

et the symbol $\Psi$ represent the spectral components of the CFA pattern. This may be a range of wavelengths the sensor element is exposed to, and can be directly associated with the filter element or the plurality of filter elements that overlay each sensor element in a period of a CFA pattern.

Let $(\{B_S\}_{S \in \Psi})$ represent coset vectors associated with a period of a CFA pattern. For example, the traditional 2×2 Bayer pattern 100 of FIG. 1 has 4 unique addresses (e.g., four sensor elements) in a CFA period where each address characterized as a location having a horizontal property and a vertical property. For example, the 2×2 pattern may be associated with a two-dimensional Cartesian coordinate system where the bottom left sensor element 103 of the 2×2 pattern corresponds with the origin, or address (0, 0). The bottom left sensor element 103 being associated with a green filter element, the coset vector at that particular sensor element would provide $B_G=\{(0,0)\}$. The sensor element 102 directly above the bottom left image sensor 103, being exposed to red wavelength would then correspond to address (0, 1), resulting in coset vector $B_R=\{(0,1)\}$. The sensor element 104 directly to the right of the bottom left sensor element 103, being exposed to a blue wavelength would correspond to address (1, 0), resulting in coset vector $B_B=\{(1,0)\}$, and the sensor element 102 directly above it would correspond to address (1, 1), providing $B_G=\{(1,1)\}$. Due to the sensor element 102 also being associated with a green filter element, the coset vectors for the green spectral range would provide $B_G=\{(0,0)\ (1,1)\}$.

A lattice matrix, or matrix generator, represented by (M). In some aspects, the matrix generator (M) may be a diagonal representation of two addresses, $\underline{n}$ and $\underline{m}$, resulting in a 2×2 matrix. The first element of the matrix, being the number in the top left, is a number of sensor elements in one period of a CFA pattern in the x-direction of the period. For example, with a 2×2 Bayer pattern, such as pattern 100 shown in FIG. 1, the number of sensor elements in the x-direction is 2. The second element of the matrix, being the number in the bottom right, is a number of sensor elements in one period of the CFA pattern in the y-direction of the CFA pattern. Using the 2×2 Bayer pattern 100 in FIG. 1, the number of sensor elements in the y-direction is 2. The other two values in the matrix M are constant, and equal to zero (0).

Example values for the sub-lattice parameters for example image sensor configurations are as follows:

|  | 2x2 Bayer CFA pattern 100 | 3x3 Sensor Element Array 200 |
|---|---|---|
| $\Psi$ | R,G,B | R,G,B,C,Y,W |
| $\{B_S\}_{S \in \Psi}$ | $B_R = \{(0,1)\}$, | $B_R = \{(2,0)\}$, |
|  | $B_B = \{(1,0)\}$, | $B_B = \{(0,2)\}$, |
|  | $B_G = \{(0,0), (1,1)\}$. | $B_W = \{(1,1)\}$, |
|  |  | $B_G = \{(0,0), (2,2)\}$, |
|  |  | $B_M = \{(1,0), (2,1)\}$, |
|  |  | $B_C = \{(0,1), (1,2)\}$. |
| M | $\begin{bmatrix} 2 & 0 \\ 0 & 2 \end{bmatrix}$ | $\begin{bmatrix} 3 & 0 \\ 0 & 3 \end{bmatrix}$ |

The $\Psi$ component represents the spectral range of exposure to sensor elements in a period of filter elements. For example, in a traditional Bayer pattern, the spectral range is Red, Green, and Blue, and thus the spectral components $\Psi=\{R,G,B\}$. In another example, where the color filter elements are 1.5 times the sensor element size, and use the traditional Bayer spectral range (RGB), the spectral components $\Psi=\{R,G,B,C,Y,W\}$. Since the sensor elements in the "1.5" configuration may be exposed to as many as four filter elements, there is a broader wavelength exposure to a sensor element as compared to a sensor element in a configuration where it is shielded by a single filter element of a single color.

In this example, a sensor element may be exposed to a combination of green and red wavelengths resulting in a light spectrum that can include yellow (570-590 nm wavelength). Using the same example, a sensor element may be exposed to a combination of green and blue wavelengths resulting in a light spectrum that includes the color cyan (490-520 nm wavelength). The 2×2 filter matrix of this example may also be arranged so that another sensor element is masked 25% by a filter element that passes a range of red light, 50% by filter elements that pass a range of green light, and 25% by a filter element that passes a range of blue light, thereby exposing that sensor element to a spectrum of light that is broader than the spectrum exposed to the remaining sensors. The resulting array has an effective sensor composition of 11% R, W, and B, respectively and 22% G and C, respectively, and the spectral components can be written as $\Psi=\{R,G,B,C,Y,W\}$. $\{B_S\}_{S \in \Psi}$ represents mutually exclusive sets of coset vectors associated with the spatial sampling locations of various filter elements in the period of filter elements. Lattice matrix M may be determined based on the number of filter elements in the period of filter elements and the number of pixels in the same. M may also be referred to herein as a generator matrix.

Further to block 1310, a frequency domain analysis can be done on an arbitrary CFA pattern using the Fourier transform of the particular CFA pattern. The Fourier transform of a CFA pattern is given by:

$$Y(\underline{f}) = \frac{1}{|\det(M)|} \sum_{S \in \Psi} \sum_{\lambda \in \bar{\Lambda}_M} \sum_{b \in B_S} e^{-j2\pi b^T \lambda} S(\underline{f} - \lambda) \quad (9)$$

Where:
- $Y(\underline{f})$: the frequency transform of any period of an image sensor,
- M: the lattice matrix representative of a period of the image sensor,
- S: spectral component that is currently being analyzed, where S is an element of $\Psi$, where $\Psi$ includes all of the spectral elements of one period of the CFA pattern, S($\underline{f}$-$\underline{\lambda}$): Fourier transform of the spectral component S in one period of the CFA pattern, $\underline{b}^T$: transposed cosite vector associated with a spectral component in one period of the CFA pattern, S∈Ψ: a particular spectral component "S" present in a period of the CFA pattern, $\underline{\lambda} \in \hat{\Lambda}_M$: $\hat{\Lambda}_M$ is a set of all modulation carrier frequencies of a given CFA period, $\underline{\lambda}$ represents a particular carrier frequency of that set, $\underline{b} \in B_S$: $B_S$ is a set of all cosite vectors associated with a spectral component in one period, $\underline{b}$ represents a particular cosite vector of that set.

In equation (9) above, $\hat{\Lambda}_M$ may be referred to as the dual lattice associated with a corresponding lattice matrix M, also known as a "generator matrix," and is given by:

$$\hat{\Lambda}_M = M^{-T}\underline{m} \cap (-\tfrac{1}{2},\tfrac{1}{2}]^2, \text{ where } \underline{m} \in \mathbb{Z}^2. \tag{10}$$

Where:

$\hat{\Lambda}_M$: set of all modulation carrier frequencies of a given CFA period, $M^{-T}$: inverse transpose of the lattice matrix M, $\underline{m}$: a point in the spectral domain, an integer on a 2d grid (x,y), the 2d grid being the spectral domain of a Fourier transform, and $\underline{\lambda}$—a particular modulation frequency in the set of modulation frequencies.

Rearranging the terms in equation (9) provides the following:

$$Y(\underline{f}) = \frac{1}{|\det(M)|} \sum_{S \in \Psi} \sum_{\underline{b} \in B_S} S(\underline{f}) + \tag{11}$$

$$\sum_{\underline{\lambda} \in \hat{\Lambda}_M \backslash (0,0)} \left\{ \frac{1}{|\det(M)|} \sum_{S \in \Psi} \sum_{\underline{b} \in B_S} e^{-j2\pi \underline{b}^T \underline{\lambda}} S(\underline{f} - \underline{\lambda}) \right\}.$$

Where:

S($\underline{f}$): Fourier transform for the spectral component S in one period of the CFA pattern.

The first term in equation (12), $$\left( \text{i.e., } \frac{1}{|\det(M)|} \sum_{S \in \Psi} \sum_{\underline{b} \in B_S} S(\underline{f}) \right)$$

comprises the baseband luminance component and, since $\Sigma_{S \in \Psi} \Sigma_{\underline{b} \in B_S} e^{-j2\pi \underline{b}^T \underline{\lambda}} = 0$ for $\underline{\lambda} \in \hat{\Lambda}_M \backslash (0,0)$, the second term in equation (14), $$\left( \sum_{\underline{\lambda} \in \hat{\Lambda}_M \backslash (0,0)} \left\{ \frac{1}{|\det(M)|} \sum_{S \in \Psi} \sum_{\underline{b} \in B_S} e^{-j2\pi \underline{b}^T \underline{\lambda}} S(\underline{f} - \underline{\lambda}) \right\} \right)$$

represents the high-pass chrominance components modulated to frequencies $\underline{\lambda} \in \hat{\Lambda}_M \backslash (0,0)$. Each chrominance component comprises a complex weighted sum of all spectral components present in one period of the CFA, with the complex weights adding up to zero. Denoted by L and $C_{\underline{\lambda}}$, the luminance and modulated chrominance components, respectively, can be written as:

$$Y(\underline{f}) = L(\underline{f}) + \Sigma_{\underline{\lambda} \in \hat{\Lambda}_M \backslash (0,0)} C_{\underline{\lambda}}(\underline{f}-\underline{\lambda}). \tag{12}$$

Where:

$$C_{\underline{\lambda}}(\underline{f}-\underline{\lambda}) = \frac{1}{|\det(M)|} \sum_{S \in \Psi} \sum_{\underline{b} \in B_S} e^{-j2\pi \underline{b}^T \underline{\lambda}} S(\underline{f}-\underline{\lambda}), \text{ and} \tag{13}$$

$$L(\underline{f}) = \frac{1}{|\det(M)|} \sum_{S \in \Psi} \sum_{\underline{b} \in B_S} S(\underline{f}). \tag{14}$$

Thus, (12) allows for an arbitrary CFA pattern to be decomposed into baseband luminance and modulated chrominance components. The Fourier transform in equation (12) may be simplified as follows:

$$Y(\underline{f}) = L(\underline{f}) + \sum_{\underline{\lambda} \in \hat{\Lambda}_M \backslash (0,0)} \{s_{\underline{\lambda}} C_1(\underline{f}-\underline{\lambda}) + t_{\underline{\lambda}} C_2(\underline{f}-\underline{\lambda})\}. \tag{20}$$

A distinction between equation (12) and equation (15) is that in the latter there are two unique chrominance components, $C_1$ and $C_2$, and each chrominance component is a real-weighted sum of all spectral components, S∈Ψ, present in a period of the CFA. The modulation coefficients $s_{\underline{\lambda}}$ and $t_{\underline{\lambda}}$ are, in general, complex, with $s_{-\underline{\lambda}} = s_{\underline{\lambda}}^*$ and $t_{-\underline{\lambda}} = t_{\underline{\lambda}}^*$ whenever $\underline{\lambda}, -\underline{\lambda} \in \hat{\Lambda}_M \backslash (0,0)$.

For a given periodic CFA pattern, the lattice generator matrix M, the set of spectral filters in one period of the CFA (Ψ), and the sets of offset vectors associated with spectral filters $\{B_S\}_{S \in \Psi}$ can be inferred as explained above. For instance, the values of Ψ, $B_S$, and M for the two example CFA patterns 100 and 200 shown in FIG. 1 and FIG. 2 are defined above. Substituting the values of Ψ, $B_S$, and M in equation (9) and equation (10), the modulation carrier frequencies $\underline{\lambda} \in \hat{\Lambda}_M \backslash (0,0)$, the modulation coefficients $s_{\underline{\lambda}}$ and $t_{\underline{\lambda}}$, and the inherent RGB to $LC_1C_2$ 3×3 transformation for a given CFA pattern may be determined. Taking the inverse Fourier transform of equation (15) enables expression of the CFA pattern y[$\underline{n}$] in terms of the luminance and chrominance components for arbitrary CFA patterns:

$$y[\underline{n}] = l[\underline{n}] + m_{C_1}[\underline{n}]c_1[\underline{n}] + m_{C_2}[\underline{n}]c_2[\underline{n}] \tag{16}$$

Where:

l[$\underline{n}$]: Luminance component at point $\underline{n}$, $m_{C_1}$[$\underline{n}$]: spatial domain modulation function for first color channel chrominance component, $c_1$[$\underline{n}$]: spatial domain of a first color channel chrominance component, $m_{C_2}$[$\underline{n}$]: spatial domain modulation function for second color channel chrominance component, $c_2$[$\underline{n}$]: spatial domain of a second color channel chrominance component.

In equation (16), $m_{C_1}[\underline{n}]$ and $m_{C_2}[\underline{n}]$ represent spatial-domain functions that modulate the chrominance signals to high-frequency carrier waves. The modulation function for chrominance channels C1 and C2 can be given by:

$$m_{C_1}[\underline{n}] = \mathcal{F}^{-1}\left[\sum_{\underline{\lambda} \in \hat{\Lambda}_M \backslash (0,0)} \{s_{\underline{\lambda}} \delta(\underline{f}-\underline{\lambda})\}\right], \text{ and} \tag{17a}$$

$$m_{C_2}[\underline{n}] = \mathcal{F}^{-1}\left[\sum_{\underline{\lambda} \in \hat{\Lambda}_M \backslash (0,0)} \{t_{\underline{\lambda}} \delta(\underline{f}-\underline{\lambda})\}\right] \tag{17b}$$

Where:

$\mathcal{F}^{-1}$: inverse Fourier transform, $s_{\underline{\lambda}}$: modulation coefficient for first color channel chrominance component, $t_{\underline{\lambda}}$: modulation coefficient for second color channel chrominance component, $\delta(\underline{f}-\underline{\lambda})$: delta represents a Dirac delta function, meaning the delta function is equal to zero when $\underline{f}-\underline{\lambda}$ is not equal to zero. Equal to infinity when $\underline{f}=\underline{\lambda}$.

Defining the set $\hat{\Lambda}_M^* = \{\underline{\lambda} \in \hat{\Lambda}_M | \lambda_1 = 0, \lambda_2 > 0\} \cup \{\underline{\lambda} \in \hat{\Lambda}_M | \lambda_1 > 0\}$, the equation (17a) and equation (17b) may be re-written as:

$$m_{C_1}[\underline{n}] = \mathcal{F}^{-1}\left[\sum_{\underline{\lambda} \in \hat{\Lambda}_M^* \backslash (0,0)} s_{\underline{\lambda}} \delta(\underline{f} - \underline{\lambda}) + s_{-\underline{\lambda}} \delta(\underline{f} + \underline{\lambda})\right], \text{ and} \quad (18a)$$

$$m_{C_2}[\underline{n}] = \mathcal{F}^{-1}\left[\sum_{\underline{\lambda} \in \hat{\Lambda}_M^* \backslash (0,0)} t_{\underline{\lambda}} \delta(\underline{f} - \underline{\lambda}) + t_{-\underline{\lambda}} \delta(\underline{f} + \underline{\lambda})\right] \quad (18b)$$

Where:

$s_{-\underline{\lambda}}$: modulation coefficient for the first color channel chrominance component at the negative of the 2d vector represented by lambda, $t_{-\underline{\lambda}}$: modulation coefficient for the second color channel chrominance component at the negative of the 2d vector represented by lambda.

As noted above, $s_{-\underline{\lambda}} = s_{\underline{\lambda}}^*$ when $-\underline{\lambda} \in \hat{\Lambda}_M \backslash (0,0)$ and equals zero otherwise. Computing the inverse Fourier transform of equation (18a) and equation (18b) provides the spatial-domain frequency-modulation function for the chrominance channel C1 and C2:

$$m_{C_1}[\underline{n}] = \sum_{\underline{\lambda} \in \hat{\Lambda}_M^* \backslash (0,0)} m_{C_1}^{\underline{\lambda}}[\underline{n}], \text{ and} \quad (19a)$$

$$m_{C_2}[\underline{n}] = \sum_{\underline{\lambda} \in \hat{\Lambda}_M^* \backslash (0,0)} m_{C_2}^{\underline{\lambda}}[\underline{n}] \quad (19b)$$

Where, $$m_{C_1}^{\underline{\lambda}}[\underline{n}] = \begin{cases} \sum_{\underline{\lambda} \in \hat{\Lambda}_M^* \backslash (0,0)} s_{\underline{\lambda}} e^{j2\pi \underline{\lambda}^T \underline{n}}, & -\underline{\lambda} \notin \hat{\Lambda}_M \\ \sum_{\underline{\lambda} \in \hat{\Lambda}_M^* \backslash (0,0)} |s_{\underline{\lambda}}| \cos(2\pi \underline{\lambda}^T \underline{n} + \varphi_{s_{\underline{\lambda}}}), & -\underline{\lambda} \in \hat{\Lambda}_M \end{cases}, \quad (20a)$$

and $$m_{C_2}^{\underline{\lambda}}[\underline{n}] = \begin{cases} \sum_{\underline{\lambda} \in \hat{\Lambda}_M^* \backslash (0,0)} t_{\underline{\lambda}} e^{j2\pi \underline{\lambda}^T \underline{n}}, & -\underline{\lambda} \notin \hat{\Lambda}_M \\ \sum_{\underline{\lambda} \in \hat{\Lambda}_M^* \backslash (0,0)} |t_{\underline{\lambda}}| \cos(2\pi \underline{\lambda}^T \underline{n} + \varphi_{t_{\underline{\lambda}}}), & -\underline{\lambda} \in \hat{\Lambda}_M \end{cases} \quad (20b)$$

In equation (20a), $|s_{\underline{\lambda}}|$ and $\phi_{\underline{\lambda}}$ respectively define the amplitude and the phase of the complex modulation coefficient $s_{\underline{\lambda}}$, where:

$$|s_{\underline{\lambda}}| = \sqrt{\text{Re}\{s_{\underline{\lambda}}\}^2 + \text{Im}\{s_{\underline{\lambda}}\}^2}, \phi_{s_{\underline{\lambda}}} = \arctan 2(\text{Im}\{s_{\underline{\lambda}}\}, \text{Re}\{s_{\underline{\lambda}}\}). \quad (21)$$

Where:

Re$\{s_{\underline{\lambda}}\}$ refers to a real number portion of the modulation coefficients at a set of x y coordinates within the spatial domain of a given CFA signal in an image, and Im$\{s_{\underline{\lambda}}\}$ refers to an imaginary portion of the modulation coefficients at the set of x y coordinates within the spatial domain of the image.

In equation (20b), $\{t_{\underline{\lambda}}\}$ and $\phi_{\underline{\lambda}}$ respectively define the amplitude and the phase of the complex modulation coefficient $s_{\underline{\lambda}}$, where:

$$|t_{\underline{\lambda}}| = \sqrt{\text{Re}\{t_{\underline{\lambda}}\}^2 + \text{Im}\{t_{\underline{\lambda}}^2\}}, \phi_{t_{\underline{\lambda}}} = \arctan 2(\text{Im}\{t_{\underline{\lambda}}\}, \text{Re}\{t_{\underline{\lambda}}\}). \quad (22)$$

Where:

Re$\{t_{\underline{\lambda}}\}$ refers to a real number portion of the modulation coefficients at a set of x y coordinates within the spatial domain of a given CFA signal in an image, and Im$\{t_{\underline{\lambda}}\}$ refers to an imaginary portion of the modulation coefficients at the set of x y coordinates within the spatial domain of the image.

Further to block 1310, as discussed above, the modulation function is determined based on a set of modulation frequencies and the set of modulation coefficients derived as discussed above. The modulation frequencies may be described as $\hat{\Lambda}_M = M\underline{m} \cap (\underline{\lambda} \in \hat{\Lambda}_M \backslash (0,0)]^2$, where $\hat{\Lambda}_M$ is a set of modulation frequencies of a given CFA period, $\underline{m} \in \mathbb{Z}^2$ where $\mathbb{Z}^2$ is a two dimensional integer lattice of a spatial domain of the image, M is the lattice matrix determined based on the sensor configuration described above, and $\underline{\lambda}$ is equivalent to the integer lattice $\mathbb{Z}^2$.

In block 1315, image data is demodulated based on the generated modulation function to determine chrominance and luminance components of the image data. In some aspects, block 1315 may perform the functions described below with respect to process 1315 of FIG. 13B. In some aspects, the image data that is demodulated may comprise an image, for example, an image of a scene captured by the image sensor. In some aspects, the image data may comprise only a portion of an image captured by the image sensor. In some aspects, the image data comprises a single plane image.

In block 1320, a triple plane image is generated based on the determined chrominance and luminance components. As disclosed above, the single plane CFA image comprises sections of luminance and chrominance components in a spatial frequency domain. For example, FIG. 7 illustrates generation of an image based on extracted luminance component and baseband signals for each chrominance component. In some aspects of block 1320, an image other than a triple plan image may be generated. For example, in some aspects, a single plane, or double plane image may be generated instead of a triple plane image.

Figure 13B:
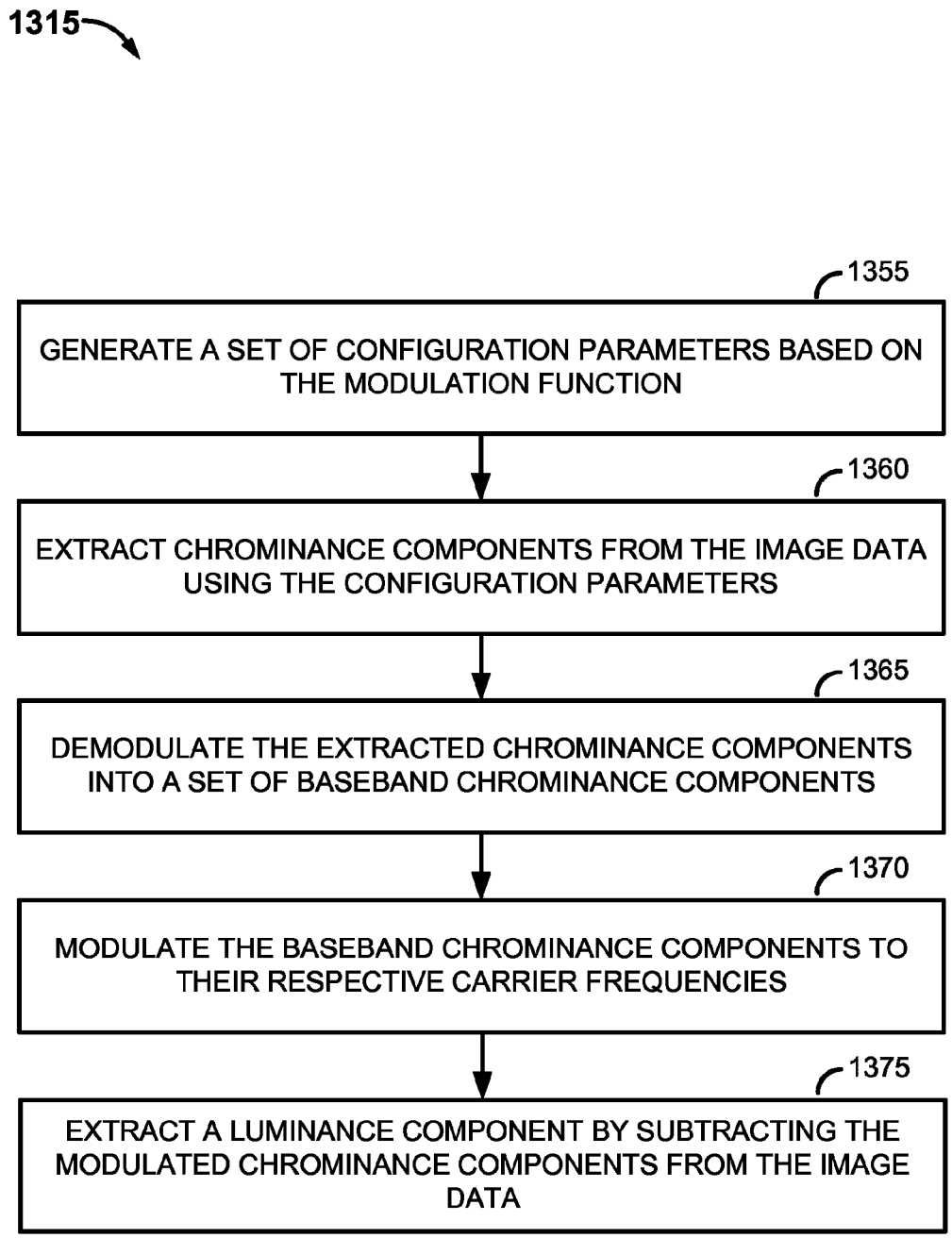
FIG. 13B is a flowchart of a method for demodulating an image.

FIG. 13B is a flowchart of one example of a process for demodulating an image. In some aspects, process 1315 of FIG. 13B may be performed by the processor 1404 of FIG. 14A or 14B. In some aspects, process 1315 may be performed by the universal demosaic 1432 of FIG. 14B.

In block 1355, a set of configuration parameters are generated based on a derived modulation function. In one example embodiment, the generated configuration parameters may include a set of high pass frequency filters configured to extract the set of chrominance components from a CFA image. In some aspects, the high pass filters may be modulated based on the configuration of the image sensor to perform the extraction. The configuration parameters may also include a set of edge detecting filters configured to determine an energy level of the image data in at least one or more of a horizontal direction, a vertical direction, and a diagonal direction. The edge detecting filters may also be configured to detect an energy level indicative of an intensity difference of radiation that is incident on neighboring sensor elements. Thus, the edge detection filters may be configured to identify points in a digital image at which the image brightness changes sharply, or has a discontinuity.

In block 1360, chrominance components from the image data are extracted based on the generated set of configuration parameters. As disclosed above, the image data comprises luminance and chrominance components in a spatial frequency domain. For example, FIG. 8 illustrates a method for filtering a single plane spectral image 500 to extract the chrominance components 501, 502 using a filter set (for example, filters 800, 801, 802, 803).

High pass filters may be used to extract modulated chrominance components from the image data. In one exemplary embodiment, a pair of high-pass filters $h_1^\lambda[n]$ and $h_2^\lambda[n]$ are designed based on the derived modulation function to extract modulated chrominance components, where $h_1^\lambda[n]$ may extract the C1 401, 501, 601 chrominance components resulting in a filtered product described as:

$$c_{1m}^\lambda[n] \triangleq m_{C_1}^\lambda[n]c_1[n] \quad (23a)$$

Where $c_{1m}^\lambda[n]$ represents the extracted C1 chrominance component, $m_{C_1}^\lambda[n]$ represents the modulation function, and $c_1[n]$ represents the C1 chrominance component before extraction using the filter for each $\lambda \in \hat{\Lambda}_M^* \backslash (0,0)$ from a given CFA pattern y[n].

The extracted C2 chrominance component may be described as:

$$c_{2m}^\lambda[n] \triangleq m_{C_2}^\lambda[n]c_2[n] \quad (23b)$$

Where:

$c_{2m}^\lambda[n]$ represents the extracted chrominance component, $m_{C_2}^\lambda[n]$ represents the modulation function for the C2 component, and $c_2[n]$ represents the C2 chrominance component before extraction using the filter for each $\lambda \in \hat{\Lambda}_M^* \backslash (0,0)$ from a given CFA pattern y[n].

The filtering equations are given by:

$$\hat{c}_{im}^\lambda[n] = \Sigma_m y[n] h_i^\lambda[n-m], \quad (24)$$

Where
i=1, 2 and is representative of the set of chrominance components, and
[y[n] is the particular CFA pattern being analyzed, in this case, the CFA pattern of the image data.

The edge detection filters may be generated in a similar manner, by using the derived modulation function or by using a known set of edge detectors. The edge detection filters may similarly be generated using the modulation function for the image data or by using a known set of edge detectors.

In block 1365, the extracted chrominance components are demodulated into a set of baseband chrominance components. As disclosed above, the extracted chrominance components 808, 809, 810, 811 can be demodulated using the following equation:

$$\hat{c}_i^\lambda[n] = \begin{cases} \dfrac{\hat{c}_{im}^\lambda[n]}{m_{C_i}^\lambda[n]}, & m_{C_i}^\lambda[n] \neq 0 \\ 0 & m_{C_i}^\lambda[n] = 0 \end{cases}, i = 1, 2. \quad (25)$$

For example, FIG. 9 illustrates the demodulation of the chrominance components extracted using the high pass filtering derived from the modulation function into a set of baseband chrominance components.

In block 1370, the baseband chrominance components are modulated to their respective carrier frequencies. As disclosed above, the baseband chrominance signals can be multiplied with the modulation functions of luminance and chrominance components in a spatial frequency domain. For example, FIG. 11 illustrates one aspect of block 1370.

In block 1375, a luminance component is extracted from the image data based on the determined carrier frequencies. In some aspects, the modulated chrominance components are subtracted from the image data to determine the luminance component. As disclosed above, the single plane CFA image comprises sections of luminance and chrominance components in a spatial frequency domain. For example, FIG. 12 and the corresponding discussion illustrate one aspect of block 1375. In some aspects, the luminance component may be obtained by subtracting all chrominance components from the image data.

Figure 14A:
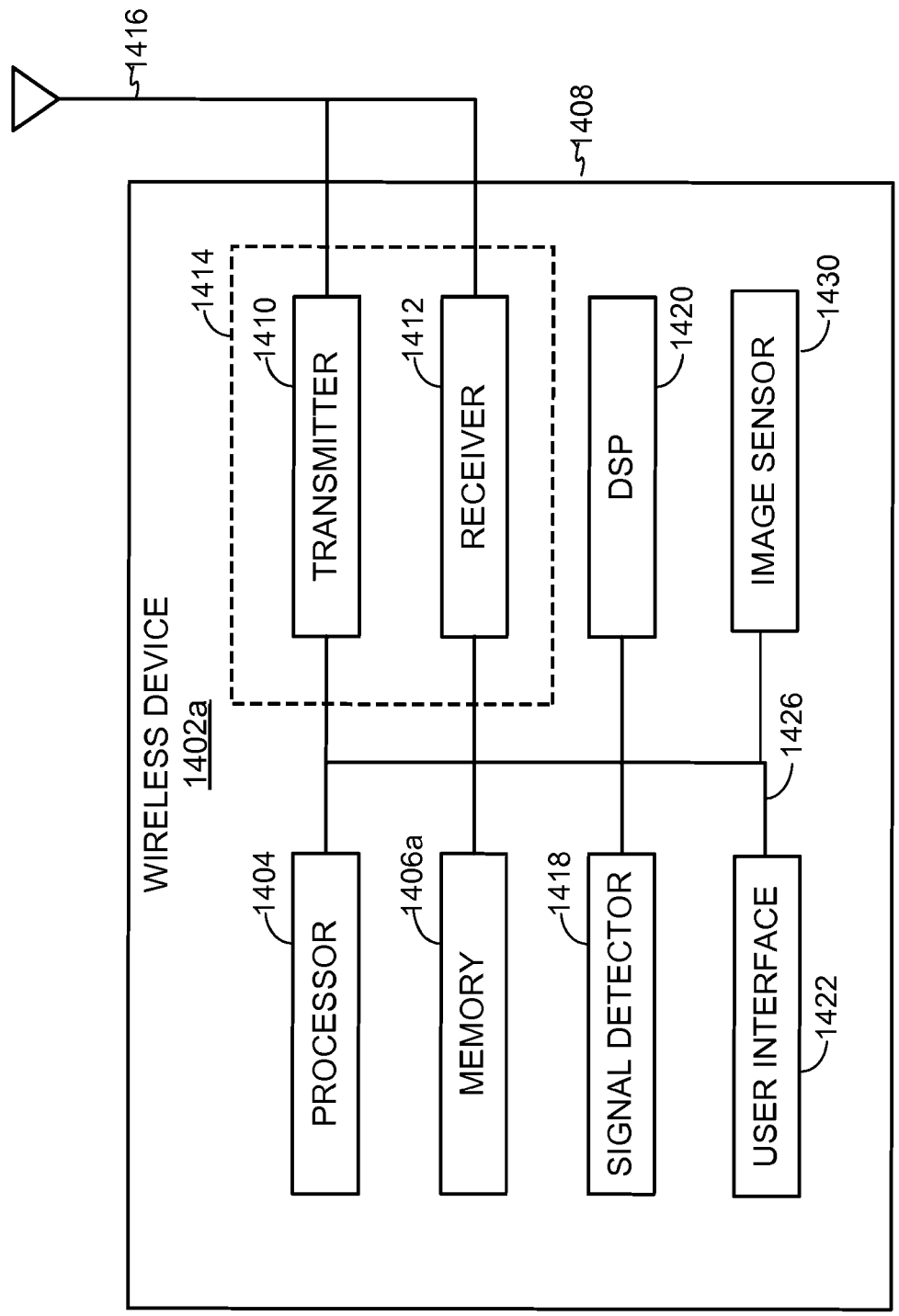
FIG. 14A illustrates an embodiment of a wireless device of one or more of the mobile devices of FIG. 1.

FIG. 14A shows an exemplary functional block diagram of a wireless device 1402a that may implement one or more of the disclosed embodiments. The wireless device 1402a may include a processor 1404 which controls operation of the wireless device 1402a. The processor 1404 may also be referred to as a central processing unit (CPU). Memory 1406a, which may include both read-only memory (ROM) and random access memory (RAM), may provide instructions and data to the processor 1404. A portion of the memory 1406a may also include non-volatile random access memory (NVRAM). The processor 1404 typically performs logical and arithmetic operations based on program instructions stored within the memory 1406a. The instructions in the memory 1406a may be executable to implement the methods described herein.

The processor 1404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1402a may also include a housing 1408 that may include a transmitter 1410 and/or a receiver 1412 to allow transmission and reception of data between the wireless device 1402a and a remote location. The transmitter 1410 and receiver 1412 may be combined into a transceiver 1414. An antenna 1416 may be attached to the housing 1408 and electrically coupled to the transceiver 1414. An image sensor 1430 may capture images and make image data available to the processor 1404. In some aspects, the image sensor 1430 may be configured to capture any one or more of the images 100, 200, or 300 discussed herein. The wireless device 1402a may also include (not shown) multiple transmitters, multiple receivers, multiple transceivers, and/or multiple antennas.

The wireless device 1402a may also include a signal detector 1418 that may be used in an effort to detect and quantify the level of signals received by the transceiver

1414. The signal detector 1418 may detect such signals as total energy, energy per subcarrier per symbol, power spectral density and other signals. The wireless device 1402a may also include a digital signal processor (DSP) 1420 for use in processing signals. The DSP 1420 may be configured to generate a packet for transmission. In some aspects, the packet may comprise a physical layer data unit (PPDU).

The wireless device 1402a may further comprise a user interface 1422 in some aspects. The user interface 1422 may comprise a keypad, a microphone, a speaker, and/or a display. The user interface 1422 may include any element or component that conveys information to a user of the wireless device 1402a and/or receives input from the user.

The various components of the wireless device 1402a may be coupled together by a bus system 1426. The bus system 1426 may include a data bus, for example, as well as a power bus, a control signal bus, and a status signal bus in addition to the data bus. Those of skill in the art will appreciate the components of the wireless device 1402a may be coupled together or accept or provide inputs to each other using some other mechanism.

Figure 14B:
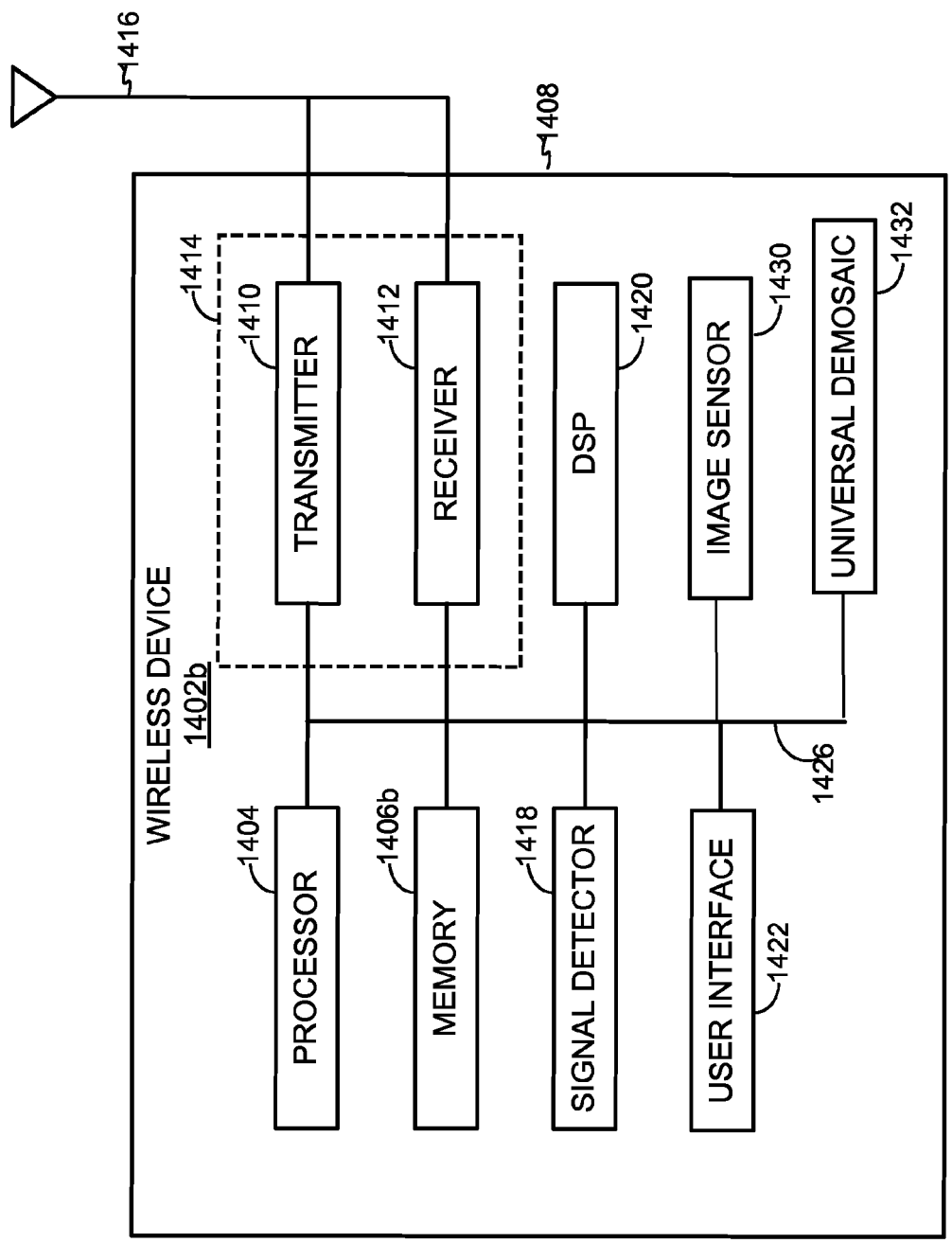
FIG. 14B illustrates an embodiment of a wireless device of one or more of the mobile devices of FIG. 1.
Figure 15:
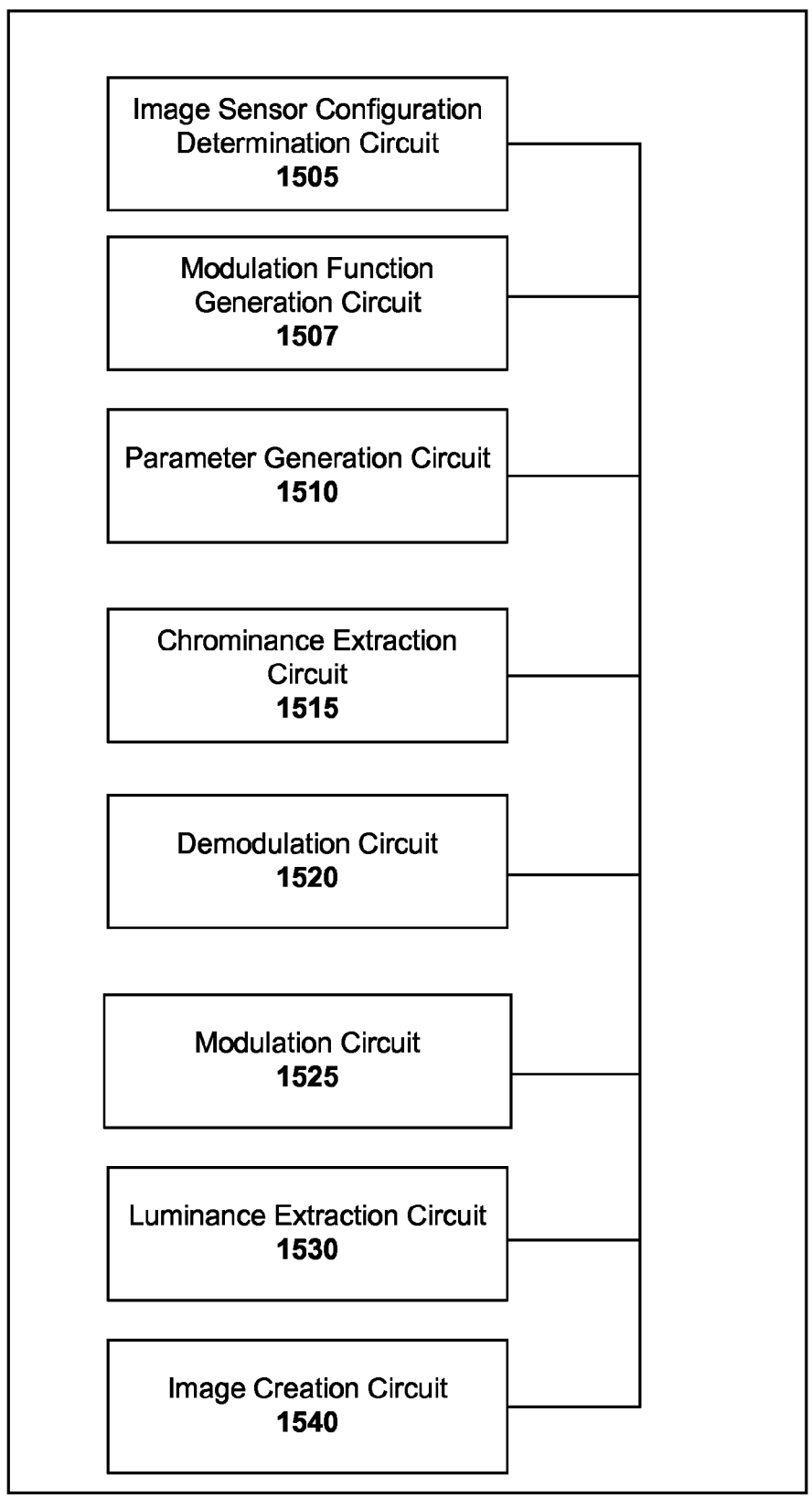
FIG. 15 is a functional block diagram of an exemplary device that may implement one or more of the embodiments disclosed above.

Although a number of separate components are illustrated in FIG. 15, those of skill in the art will recognize that one or more of the components may be combined or commonly implemented. For example, the processor 1404 may be used to implement not only the functionality described above with respect to the processor 1404, but also to implement the functionality described above with respect to the signal detector 1418 and/or the DSP 1420. Further, each of the components illustrated in FIG. 14 may be implemented using a plurality of separate elements.

The wireless device 1402a may be used to transmit and/or receive communications. Certain aspects contemplate signal detector 1418 being used by software running on memory 1406a and processor 1404 to detect the presence of a transmitter or receiver.

FIG. 14B shows an exemplary functional block diagram of a wireless device 1402b that may implement one or more of the disclosed embodiments. The wireless device 1402b may include components similar to those shown above with respect to FIG. 14B. For example, the device 1402b may include a processor 1404 which controls operation of the wireless device 1402b. The processor 1404 may also be referred to as a central processing unit (CPU). Memory 1406b, which may include both read-only memory (ROM) and random access memory (RAM), may provide instructions and data to the processor 1404. A portion of the memory 1406b may also include non-volatile random access memory (NVRAM). The processor 1404 typically performs logical and arithmetic operations based on program instructions stored within the memory 1406b. The instructions in the memory 1406b may be executable to implement the methods described herein. In some aspects, the instructions stored in the memory 1406b may differ from the instructions stored in the memory 1406a of FIG. 14A. For example, as discussed above, in some aspects, the processor 1404 of FIG. 14A may be configured by instructions stored in the memory 1406a to perform one or more of the methods disclosed herein. In the alternative, the processor 1404 in the device 1402b may perform the methods disclosed herein in concert with a universal demosaic component 1432, discussed below.

The processor 1404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The universal demosaic component 1432 may be configured to demosaic data received from the image sensor 1430. The universal demosaic 1432 may receive information defining a configuration of the image sensor from one or more of the processor 1404 and/or the image sensor 1430. The configuration data may include data indicating a configuration of image sensor elements of the image sensor 1430, for example, as described above with respect to FIG. 1, 2 or 3, and information indicating a configuration of filters that filter light before it reaches the image sensor elements. Based at least on the received image sensor configuration information, the universal demosaic may demosaic data generated by the image sensor 1430. The universal demosaic component may then output data defining a triple plane image onto the data bus 1426.

The wireless device 1402b may also include a housing 1408 that may include a transmitter 1410 and/or a receiver 1412 to allow transmission and reception of data between the wireless device 1402b and a remote location. The transmitter 1410 and receiver 1412 may be combined into a transceiver 1414. An antenna 1416 may be attached to the housing 1408 and electrically coupled to the transceiver 1414. An image sensor 1430 may capture images and make image data available to the processor 1404. In some aspects, the image sensor 1430 may be configured to capture any one or more of the images 100, 200, or 300 discussed herein. The wireless device 1402b may also include (not shown) multiple transmitters, multiple receivers, multiple transceivers, and/or multiple antennas.

The wireless device 1402b may also include a signal detector 1418 that may be used in an effort to detect and quantify the level of signals received by the transceiver 1414. The signal detector 1418 may detect such signals as total energy, energy per subcarrier per symbol, power spectral density and other signals. The wireless device 1402b may also include a digital signal processor (DSP) 1420 for use in processing signals. The DSP 1420 may be configured to generate a packet for transmission. In some aspects, the packet may comprise a physical layer data unit (PPDU).

The wireless device 1402b may further comprise a user interface 1422 in some aspects. The user interface 1422 may comprise a keypad, a microphone, a speaker, and/or a display. The user interface 1422 may include any element or component that conveys information to a user of the wireless device 1402b and/or receives input from the user.

The various components of the wireless device 1402b may be coupled together by a bus system 1426. The bus system 1426 may include a data bus, for example, as well as a power bus, a control signal bus, and a status signal bus in addition to the data bus. Those of skill in the art will appreciate the components of the wireless device 1402b may be coupled together or accept or provide inputs to each other using some other mechanism.

Although a number of separate components are illustrated in FIG. 15, those of skill in the art will recognize that one or more of the components may be combined or commonly implemented. For example, the processor 1404 may be used to implement not only the functionality described above with respect to the processor 1404, but also to implement the functionality described above with respect to the signal detector 1418 and/or the DSP 1420. Further, each of the components illustrated in FIG. 14 may be implemented using a plurality of separate elements.

The wireless device 1402b may be used to transmit and/or receive communications. Certain aspects contemplate signal detector 1418 being used by software running on memory 1406b and processor 1404 to detect the presence of a transmitter or receiver.

FIG. 15 is a functional block diagram of an exemplary device 1500 that may implement one or more of the embodiments disclosed above. The device 1500 includes an image sensor configuration determination circuit 1505. In an embodiment, the determination circuit 1505 may be configured to perform one or more of the functions discussed above with respect to block 1305. In an embodiment, the determination circuit 1505 may include an electronic hardware processor, such as processor 1404 of FIG. 14A or 14B. The determination circuit 1505 may also include one or more of a processor, signal generator, transceiver, decoder, or a combination of hardware and/or software component(s), circuits, and/or module(s).

The device 1500 further includes a modulation function generation circuit 1507. In an embodiment, the modulation function generation circuit 1507 may be configured to perform one or more of the functions discussed above with respect to block 1310. In an embodiment, the modulation function generation circuit 1507 may include an electronic hardware processor, such as processor 1404 of FIG. 14A or 14B. In some aspects, the modulation function generation circuit 1507 may comprise one or more of a processor, signal generator, transceiver, decoder, or a combination of hardware and/or software component(s), circuits, and/or module(s). In some aspects, the modulation function generation circuit 1507 may include the universal demosaic 1432 shown above in FIG. 14B.

The device 1500 further includes a parameter generation circuit 1510. In an embodiment, the parameter generation circuit 1510 may be configured to perform one or more of the functions discussed above with respect to block 1355. In an embodiment, the parameter generation circuit 1510 may include an electronic hardware processor, such as processor 1404 of FIG. 14A or 14B. In some aspects, the parameter generation circuit 1510 may comprise one or more of a processor, signal generator, transceiver, decoder, or a combination of hardware and/or software component(s), circuits, and/or module(s).

The device 1500 further includes a chrominance extraction circuit 1515. In an embodiment, the chrominance extraction circuit 1515 may be configured to perform one or more of the functions discussed above with respect to block 1360. In an embodiment, the chrominance extraction circuit 1515 may include an electronic hardware processor, such as processor 1404 of FIG. 14A or 14B. In some aspects, the chrominance extraction circuit 1515 may comprise one or more of a processor, signal generator, transceiver, decoder, or a combination of hardware and/or software component(s), circuits, and/or module(s).

The device 1500 further includes a demodulation circuit 1520. In an embodiment, the demodulation circuit 1520 may be configured to perform one or more of the functions discussed above with respect to block 1365. In an embodiment, the demodulation circuit 1520 may include an electronic hardware processor, such as processor 1404 of FIG. 14A or 14B. In some aspects, the demodulation circuit 1520 may comprise one or more of a processor, signal generator, transceiver, decoder, or a combination of hardware and/or software component(s), circuits, and/or module(s).

The device 1500 further includes a modulation circuit 1525. In an embodiment, the modulation circuit 1525 may be configured to perform one or more of the functions discussed above with respect to block 1370. In an embodiment, the modulation circuit 1525 may include an electronic hardware processor, such as processor 1404 of FIG. 14A or 14B. In some aspects, the modulation circuit 1525 may comprise one or more of a processor, signal generator, transceiver, decoder, or a combination of hardware and/or software component(s), circuits, and/or module(s).

The device 1500 further includes a luminance extraction circuit 1530. In an embodiment, the luminance extraction circuit 1530 may be configured to perform one or more of the functions discussed above with respect to block 1375. In an embodiment, the luminance extraction circuit 1530 may include an electronic hardware processor, such as processor 1404 of FIG. 14A or 14B. In some aspects, the luminance extraction circuit 1530 may comprise one or more of a processor, signal generator, transceiver, decoder, or a combination of hardware and/or software component(s), circuits, and/or module(s).

The device 1500 further includes an image creation circuit 1540. In an embodiment, the image creation circuit 1540 may be configured to perform one or more of the functions discussed above with respect to block 1320. In an embodiment, the image creation circuit 1540 may include an electronic hardware processor, such as processor 1404 of FIG. 14A or 14B. In some aspects, the image creation circuit 1540 may comprise one or more of a processor, signal generator, transceiver, decoder, or a combination of hardware and/or software component(s), circuits, and/or module(s). For example, in some aspects, the image creation circuit 1540 may include the universal demosaic 1432 and the processor 1404. For example, the universal demosaic 1432 may generate data for the triple plane image and send the data to the processor 1404. The processor may then generate the image.

The technology described herein is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor.

In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A demosaicing system for converting image data generated by an image sensor into an image, the demosaicing system comprising:
    an electronic hardware processor, configured to:
        receive information indicating a configuration of sensor elements of the image sensor and a configuration of filters for the sensor elements,
        generate a modulation function based on the configuration of sensor elements and the configuration of filters,
        demodulate the image data based on the generated modulation function to determine chrominance and luminance components of the image data, and
        generate the image based on the determined chrominance and luminance components.

2. The system of claim 1, wherein the electronic hardware processor is further configured to:
    generate a set of configuration parameters based on the modulation function,
    extract a set of chrominance components from the image data using the set of configuration parameters,
    demodulate the chrominance components into a set of baseband chrominance components using the set of configuration parameters,
    modulate the set of baseband chrominance components to determine a set of carrier frequencies,
    extract a luminance component from the image data using the set of carrier frequencies, and
    wherein the image is generated based on the extracted luminance component and the determined set of baseband chrominance components.

3. The demosaicing system of claim 1, wherein the configuration of the image sensor further comprises one or more of the following:
    a period of filter elements comprising at least one filter element, each filter element comprising a spectral range, and the array of filter elements comprising a repeating pattern of the period of filter elements,
    a size of each filter element having a length dimension and a width dimension that is different than a respective length dimension and a respective width dimension of a corresponding sensor element of the image sensor, and
    an array of dynamic range sensor elements, each dynamic range sensor element having an integration time, wherein the integration time controls a level of sensitivity of the corresponding dynamic range sensor element,
    wherein determination of the modulation function is based on at least one of the period of filter elements, the size of each filter element, and the array of dynamic range sensor elements.

4. The demosaicing system of claim 3, wherein the electronic hardware processor determines a set of sub-lattice parameters based on the configuration of the image sensor, the set of sub-lattice parameters comprising:
    a lattice matrix M based on a number of filter elements in the period of filter elements,
    a set of values comprising a spectral range of each filter element in one period of the image sensor $\Psi$, and
    a set of offset vectors $\{B_S\}_{S \in \Psi}$, each vector comprising a coordinate on an x y plane for a corresponding filter element in the period of filter elements,
    wherein determination of the modulation function is based on the set of sub-lattice parameters.

5. The demosaicing system of claim 3, wherein the electronic hardware processor derives a set of modulation frequencies $\hat{\Lambda}_M = M\underline{m} \cap (\lambda \in \hat{\Lambda}_M \setminus (0,0))]^2$, $\underline{m} \in \mathbb{Z}^2$ based on the configuration of the image sensor, where:
    $\hat{\Lambda}_M$=modulation frequency,
    M=the lattice matrix,
    $\mathbb{Z}^2$=two-dimensional integer lattice of a spatial domain of the image data, and
    $\underline{\lambda}$=a set of x y coordinates within a spectral range of the image data,
    wherein determination of the modulation function is based on the set of derived modulation frequencies.

6. The demosaicing system of claim 4, wherein the electronic hardware processor derives a set of modulation coefficients $s_{\underline{\lambda}}$ and $t_{\underline{\lambda}}$ based on the sub-lattice parameters, where:

$$|s_{\underline{\lambda}}| = \sqrt{\text{Re}\{s_{\underline{\lambda}}\}^2 + \text{Im}\{s_{\underline{\lambda}}\}^2}, \text{ and}$$

$$|t_{\underline{\lambda}}| = \sqrt{\text{Re}\{t_{\underline{\lambda}}\}^2 + \text{Im}\{t_{\underline{\lambda}}\}^2}, \text{ where:}$$

Re$\{s_{\underline{\lambda}}\}$ and Re($t_{\underline{\lambda}}$) refer to a real number portion of the modulation coefficients at a set of x y coordinates within the spatial domain of the image data, and
Im$\{s_{\underline{\lambda}}\}$ and Im$\{t_{\underline{\lambda}}\}$ refer to an imaginary portion of the modulation coefficients at the set of x y coordinates within the spatial domain of the image data,
wherein determination of the modulation function is based on the derived set of modulation coefficients.

7. The demosaicing system of claim 6, wherein the modulation function is determined using at least the set of modulation frequencies and the set of modulation coefficients where $$m_{C_1}^\lambda[\underline{n}] = \begin{cases} \sum_{\underline{\lambda} \in \hat{\Lambda}_M^* \backslash (0,0)} s_{\underline{\lambda}} e^{j2\pi \underline{\lambda}^T \underline{n}}, & -\underline{\lambda} \notin \hat{\Lambda}_M \\ \sum_{\underline{\lambda} \in \hat{\Lambda}_M^* \backslash (0,0)} |s_{\underline{\lambda}}| \cos(2\pi \underline{\lambda}^T \underline{n} + \varphi_{s_{\underline{\lambda}}}), & -\underline{\lambda} \in \hat{\Lambda}_M \end{cases}$$ and, $$m_{C_2}^\lambda[\underline{n}] = \begin{cases} \sum_{\underline{\lambda} \in \hat{\Lambda}_M^* \backslash (0,0)} s_{\underline{\lambda}} e^{j2\pi \underline{\lambda}^T \underline{n}}, & -\underline{\lambda} \notin \hat{\Lambda}_M \\ \sum_{\underline{\lambda} \in \hat{\Lambda}_M^* \backslash (0,0)} |s_{\underline{\lambda}}| \cos(2\pi \underline{\lambda}^T \underline{n} + \varphi_{s_{\underline{\lambda}}}), & -\underline{\lambda} \in \hat{\Lambda}_M \end{cases}$$

where:
$\underline{n}$=the set of all vectors in $\mathbb{Z}^2$, and
$\underline{\lambda}^T$=a sampled set of x y coordinates within a spectral range of the image data.

8. The demosaicing system of claim 1, wherein the set of configuration parameters comprise:
a set of high pass frequency filters configured to extract the set of chrominance components from the image data based on the configuration of the image sensor,
a set of edge detecting filters configured to determine an energy level of the image data in at least a horizontal direction, a vertical direction, and a diagonal direction, the energy level indicative of an intensity difference of radiation that is incident on neighboring sensor elements,
wherein the configuration parameters are determined based on the modulation function.

9. The demosaicing system of claim 8, wherein the electronic hardware processor is further configured to estimate an energy level of each baseband chrominance component in the set of baseband chrominance components based on the set of edge detecting filters.

10. The demosaicing system of claim 1, wherein the electronic hardware processor comprises an external interface configured to electronically receive the image sensor configuration information from another device.

11. The demosaicing system of claim 1, wherein the image data comprises a single plane spectral image, and the image comprises at least one spectral plane.

12. A method for converting image data generated by an image sensor into a second image, comprising:
receiving information indicating a configuration of sensor elements of the image sensor and a configuration of filters for the sensor elements;
generating a modulation function based on the configuration of sensor elements and the configuration of filters;
demodulating the image data based on the generated modulation function to determine chrominance and luminance components of the image data; and
generating the second image based on the determined chrominance and luminance components.

13. The method of claim 12, further comprising:
generating a set of configuration parameters based on the determined modulation function;
extracting a set of chrominance components from the image data using the set of configuration parameters;
demodulating the set of chrominance components into a set of baseband chrominance components using the set of configuration parameters;
modulating the set of baseband chrominance components to determine a set of carrier frequencies; and
extracting a luminance component from the image data using the set of carrier frequencies,
wherein the generation of the second image is based on the extracted luminance component and the set of baseband chrominance components.

14. The method of claim 12, wherein the configuration of the image sensor is defined by one or more of the following:
a period of filter elements comprising at least one filter element, each filter element comprising a spectral range, and the array of filter elements comprising a repeating pattern of the period of filter elements,
a size of each filter element having a length dimension and a width dimension that is different than a respective length dimension and a respective width dimension of a corresponding sensor element of the image sensor, and
an array of dynamic range sensor elements, each dynamic range sensor element having an integration time, wherein the integration time controls a level of sensitivity of the corresponding dynamic range sensor element,
wherein determination of the modulation function is based on at least one of the period of filter elements, the size of each filter element, and the array of dynamic range sensor elements.

15. The method of claim 14, further comprising determining a set of sub-lattice parameters based on the configuration of the image sensor, the set of sub-lattice parameters comprising:
a lattice matrix M based on a number of filter elements in the period of filter elements,
a set of values comprising a spectral range of each filter element in one period of the image sensor $\Psi$, and
a set of offset vectors $\{B_S\}_{S \in \Psi}$, each vector comprising a coordinate on an x y plane for a corresponding filter element in the period of filter elements,
wherein determination of the modulation function is based on the set of sub-lattice parameters.

16. The method of claim 14, further comprising deriving a set of modulation frequencies $\hat{\Lambda}_M = M\underline{m} \cap (\underline{\lambda} \in \hat{\Lambda}_M \backslash (0,0)]^2$, $\underline{m} \in \mathbb{Z}^2$ based on the configuration of the image sensor, where:
$\hat{\Lambda}_M$=modulation frequency,
M=the lattice matrix,
$\mathbb{Z}^2$=two-dimensional integer lattice of a spatial domain of the image data, and
$\underline{\lambda}$=a set of x y coordinates within a spectral range of the image data,
wherein determination of the modulation function is based on the modulation frequencies.

17. The method of claim 15, further comprising deriving a set of modulation coefficients $s_{\underline{\lambda}}$ and $t_{\underline{\lambda}}$ based on the sub-lattice parameters, where:

$$|s_{\underline{\lambda}}| = \sqrt{\text{Re}\{s_{\underline{\lambda}}\}^2 + \text{Im}\{s_{\underline{\lambda}}\}^2}, \text{ and}$$

$$|t_{\underline{\lambda}}| = \sqrt{\text{Re}\{t_{\underline{\lambda}}\}^2 + \text{Im}\{t_{\underline{\lambda}}\}^2}, \text{ where:}$$

$\text{Re}\{s_{\underline{\lambda}}\}$ and $\text{Re}\{t_{\underline{\lambda}}\}$ refer to a real number portion of the modulation coefficients at a set of x y coordinates within the spatial domain of the image data, and
$\text{Im}\{s_{\underline{\lambda}}\}$ and $\text{Im}\{t_{\underline{\lambda}}\}$ refer to an imaginary portion of the modulation coefficients at the set of x y coordinates within the spatial domain of the image data,
wherein determination of the modulation function is based on the set of modulation coefficients.

18. The method of claim 17, wherein the modulation function is determined using at least the set of modulation frequencies and the set of modulation coefficients where $$m_{C_1}^{\lambda}[\underline{n}] = \begin{cases} \sum_{\underline{\lambda} \in \hat{\Lambda}_M^* \backslash (0,0)} s_{\underline{\lambda}} e^{j2\pi \underline{\lambda}^T \underline{n}}, & -\underline{\lambda} \notin \hat{\Lambda}_M \\ \sum_{\underline{\lambda} \in \hat{\Lambda}_M^* \backslash (0,0)} |s_{\underline{\lambda}}| \cos(2\pi \underline{\lambda}^T \underline{n} + \varphi_{s_{\underline{\lambda}}}), & -\underline{\lambda} \in \hat{\Lambda}_M \end{cases} \text{ and,}$$

$$m_{C_2}^{\lambda}[\underline{n}] = \begin{cases} \sum_{\underline{\lambda} \in \hat{\Lambda}_M^* \backslash (0,0)} s_{\underline{\lambda}} e^{j2\pi \underline{\lambda}^T \underline{n}}, & -\underline{\lambda} \notin \hat{\Lambda}_M \\ \sum_{\underline{\lambda} \in \hat{\Lambda}_M^* \backslash (0,0)} |s_{\underline{\lambda}}| \cos(2\pi \underline{\lambda}^T \underline{n} + \varphi_{s_{\underline{\lambda}}}), & -\underline{\lambda} \in \hat{\Lambda}_M \end{cases}$$

$\underline{n}$=the set of all vectors $\mathbb{Z}^2$, and
$\underline{\lambda}$=a sampled set of x y coordinates within a spectral range of the image data.

19. The method of claim 12, wherein the set of configuration parameters comprise:
a set of high pass frequency filters configured to extract the set of chrominance components from the image data based on the configuration of the image sensor,
a set of edge detecting filters configured to determine an energy level of the image data in at least a horizontal direction, a vertical direction, and a diagonal direction, the energy level indicative of an intensity difference of radiation that is incident on neighboring sensor elements,
wherein the configuration parameters are determined based on the modulation function.

20. The method of claim 19, further comprising estimating an energy level of each baseband chrominance component in the set of baseband chrominance components based on the set of edge detecting filters.

21. A non-transitory computer-readable medium comprising code that, when executed, causes an electronic hardware processor to perform a method of converting image data generated by an image sensor into a second image, the method comprising:
receiving information indicating a configuration of sensor elements of the image sensor and a configuration of filters for the sensor elements;
generating a modulation function based on the configuration of sensor elements and the configuration of filters;
demodulating the image data based on the generated modulation function to determine chrominance and luminance components of the image data; and
generating the second image based on the determined chrominance and luminance components.

22. The computer readable storage medium of claim 21, the method further comprising:
generating a set of configuration parameters based on the determined modulation function;
extracting a set of chrominance components from the image data using the set of configuration parameters;
demodulating the set of chrominance components into a set of baseband chrominance components using the set of configuration parameters;
modulating the set of baseband chrominance components to determine a set of carrier frequencies;
extracting a luminance component from the image data using the set of carrier frequencies, and
wherein the generation of the second image is based on the extracted luminance component and the set of baseband chrominance components.

23. The non-transitory computer-readable medium of claim 21, wherein the configuration of the image sensor is defined by one or more of the following:
a period of filter elements comprising at least one filter element, each filter element comprising a spectral range, and the array of filter elements comprising a repeating pattern of the period of filter elements,
a size of each filter element having a length dimension and a width dimension that is different than a respective length dimension and a respective width dimension of a corresponding sensor element of the image sensor, and
an array of dynamic range sensor elements, each dynamic range sensor element having an integration time, wherein the integration time controls a level of sensitivity of the corresponding dynamic range sensor element,
wherein determination of the modulation function is based on at least one of the period of filter elements, the size of each filter element, and the array of dynamic range sensor elements.

24. The non-transitory computer-readable medium of claim 23, the method further comprising determining a set of sub-lattice parameters based on the configuration of the image sensor, the set of sub-lattice parameters comprising:
a lattice matrix M based on a number of filter elements in the period of filter elements,
a set of values comprising a spectral range of each filter element in one period of the image sensor $\Psi$, and
a set of offset vectors $\{B_S\}_{S \in \Psi}$, each vector comprising a coordinate on an x y plane for a corresponding filter element in the period of filter elements,
wherein determination of the modulation function is based on the set of sub-lattice parameters.

25. The non-transitory computer-readable medium of claim 24, the method further comprising deriving a set of modulation frequencies ii, $\hat{\Lambda}_M = M\underline{m} \cap (\underline{\lambda} \in \hat{\Lambda}_M \backslash (0,0))^2$, $\underline{m} \in \mathbb{Z}^2$ based on the configuration of the image sensor, where:
$\hat{\Lambda}_M$=modulation frequency,
M=the lattice matrix,
$\mathbb{Z}^2$=two-dimensional integer lattice of a spatial domain of the image data, and
$\lambda$=a set of x y coordinates within a spectral range of the image data,
wherein determination of the modulation function is based on the modulation frequencies.

26. The non-transitory computer-readable medium of claim 24, the method further comprising deriving a set of modulation coefficients $s_\lambda$ and $t_\lambda$ based on the sub-lattice parameters, where:

$|s_\lambda| = \sqrt{\text{Re}\{s_\lambda\}^2 + \text{Im}\{s_\lambda\}^2}$, and $|t_\lambda| = \sqrt{\text{Re}\{t_\lambda\}^2 + \text{Im}\{t_\lambda\}^2}$, where:

Re$\{s_\lambda\}$ and Re$\{t_\lambda\}$ refer to a real number portion of the modulation coefficients at a set of x y coordinates within the spatial domain of the image data, and
Im$\{s_\lambda\}$ and Im$\{t_\lambda\}$ refer to an imaginary portion of the modulation coefficients at the set of x y coordinates within the spatial domain of the image data,
wherein determination of the modulation function is based on the modulation coefficients.

27. The non-transitory computer-readable medium of claim 26, wherein the modulation function is determined using at least the set of modulation frequencies and the set of modulation coefficients where $$m_{C_1}^{\lambda}[\underline{n}] = \begin{cases} \sum_{\lambda \in \hat{\Lambda}_M^* \setminus (0,0)} s_\lambda e^{j2\pi \underline{\lambda}^T \underline{n}}, & -\underline{\lambda} \notin \hat{\Lambda}_M \\ \sum_{\lambda \in \hat{\Lambda}_M^* \setminus (0,0)} |s_\lambda| \cos(2\pi \underline{\lambda}^T \underline{n} + \varphi_{s_\lambda}), & -\underline{\lambda} \in \hat{\Lambda}_M \end{cases}$ and, $m_{C_2}^{\lambda}[\underline{n}] = \begin{cases} \sum_{\lambda \in \hat{\Lambda}_M^* \setminus (0,0)} s_\lambda e^{j2\pi \underline{\lambda}^T \underline{n}}, & -\underline{\lambda} \notin \hat{\Lambda}_M \\ \sum_{\lambda \in \hat{\Lambda}_M^* \setminus (0,0)} |s_\lambda| \cos(2\pi \underline{\lambda}^T \underline{n} + \varphi_{s_\lambda}), & -\underline{\lambda} \in \hat{\Lambda}_M \end{cases}$$

where:
$\underline{n}$=the set of all vectors in $\mathbb{Z}^2$, and
$\underline{\lambda}^T$=a sampled set of x y coordinates within a spectral range of the image data.

28. The non-transitory computer-readable medium of claim 21, wherein the set of configuration parameters comprise:
a set of high pass frequency filters configured to extract the set of chrominance components from the image data based on the configuration of the image sensor,
a set of edge detecting filters configured to determine an energy level of the image data in at least a horizontal direction, a vertical direction, and a diagonal direction, the energy level indicative of an intensity difference of radiation that is incident on neighboring sensor elements,
wherein the configuration parameters are determined based on the modulation function.

29. The non-transitory computer-readable medium of claim 21, the method further comprising estimating an energy level of each baseband chrominance component in the set of baseband chrominance components based on a set of edge detecting filters.

30. A demosaicing apparatus for converting a image data generated by an image sensor into a second image, comprising:
means for receiving information indicating a configuration of sensor elements of the image sensor and a configuration of filters for the sensor elements;
means for generating a modulation function based on the configuration of sensor elements and the configuration of filters;
means for demodulating the image data based on the generated modulation function to determine chrominance and luminance components of the image data; and
means for generating an image based on the determined chrominance and luminance components.

* * * * *